United States Patent
Numata et al.

(10) Patent No.: US 12,492,783 B2
(45) Date of Patent: Dec. 9, 2025

(54) TANK AND METHOD OF RECYCLING REINFORCING FIBER

(71) Applicant: TOYOTA JIDOSHA KABUSHIKI KAISHA, Toyota (JP)

(72) Inventors: Yusuke Numata, Toyota (JP); Takuya Sukeda, Toyota (JP); Daisuke Sakuma, Toyota (JP); Hiroyuki Ishii, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 301 days.

(21) Appl. No.: 18/206,777

(22) Filed: Jun. 7, 2023

(65) Prior Publication Data
US 2024/0044451 A1 Feb. 8, 2024

(30) Foreign Application Priority Data
Aug. 8, 2022 (JP) ................. 2022-126054

(51) Int. Cl.
F17C 1/06 (2006.01)

(52) U.S. Cl.
CPC ........ *F17C 1/06* (2013.01); *F17C 2203/0604* (2013.01); *F17C 2203/0624* (2013.01); *F17C 2203/067* (2013.01); *F17C 2203/0673* (2013.01); *F17C 2209/2154* (2013.01)

(58) Field of Classification Search
CPC ................. F17C 1/06; F17C 2203/067; F17C 2209/2154; F17C 2203/0663; F17C 2203/0624; F17C 1/04; F17C 1/02; F17C 1/16; B29B 17/00; B29B 17/0206; B29B 2017/0203
See application file for complete search history.

(56) References Cited

U.S. PATENT DOCUMENTS

| 5,657,594 A * | 8/1997 | Morita ............... F17C 3/027 52/249 |
| 8,727,174 B2 * | 5/2014 | Otsubo ............... F17C 13/06 220/588 |
| 2017/0157801 A1 * | 6/2017 | Yang .................. B29B 17/02 |
| 2020/0079918 A1 * | 3/2020 | Toyoshima ........... B09B 3/45 |
| 2022/0371226 A1 * | 11/2022 | Numata ............... B29B 17/02 |

FOREIGN PATENT DOCUMENTS

| CN | 101980857 A | 2/2011 |
| CN | 107022108 A | 8/2017 |
| JP | 2005-255835 A | 9/2005 |
| JP | 2017-104847 A | 6/2017 |

(Continued)

OTHER PUBLICATIONS

U.S. Appl. No. 18/325,703, filed May 30, 2023 in the name of Yusuke Numata et al.

*Primary Examiner* — Don M Anderson
(74) *Attorney, Agent, or Firm* — Oliff PLC

(57) ABSTRACT

The present embodiment is a tank having a liner and a first protective layer disposed on an outer peripheral surface of the liner and configured such that a resin-impregnated fiber bundle including a reinforcing fiber bundle and a first matrix resin is wound around the liner, wherein the resin-impregnated fiber bundle has a folded portion fixed in a bent state at a winding end portion of the resin-impregnated fiber bundle.

15 Claims, 18 Drawing Sheets

(56) References Cited

FOREIGN PATENT DOCUMENTS

| | | |
|---|---|---|
| JP | 2020-37638 A | 3/2020 |
| JP | 2020-037978 A | 3/2020 |
| JP | 2020-45407 A | 3/2020 |
| JP | 2020-50704 A | 4/2020 |
| JP | 2022-179883 A | 12/2022 |
| WO | 2009/121368 A1 | 10/2009 |
| WO | 2018/212016 A1 | 11/2018 |

* cited by examiner

TANK AND METHOD OF RECYCLING REINFORCING FIBER

CROSS-REFERENCE TO RELATED APPLICATION

This application claims priority to Japanese Patent Application No. 2022-126054 filed on Aug. 8, 2022, incorporated herein by reference in its entirety.

BACKGROUND

1. Technical Field

The present disclosure relates to a tank and a method of recycling a reinforcing fiber.

2. Description of Related Art

Carbon Fiber Reinforced Plastic (CFRP) is lightweight, highly rigid, and resistant to high pressure gas. Therefore, it is used as a reinforcing material in a hydrogen tank or the like of a fuel cell (FC) electric vehicle. Further, a hybrid-type fiber-reinforced plastic in which a Glass Fiber Reinforced Plastic (GFRP) layer is disposed as a protective material on a carbon fiber-reinforced resin layer is also employed.

However, carbon fibers and glass fibers contained in the carbon fiber-reinforced resin or the glass fiber-reinforced resin are expensive, and have a high environmental burden because the amount of generated at the time of manufacture is large and it is difficult to dispose of the carbon fibers and glass fibers. Therefore, a method of collecting and recycling carbon fibers and glass fibers from a used fiber-reinforced resin has been studied.

For example, Japanese Unexamined Patent Application Publication No. 2017-104847 (JP 2017-104847 A) discloses a reinforcing fiber collection method including an unwinding step of unwinding a reinforcing fiber while separating a resin from a reinforcing component on which the reinforcing fiber is wound and that is impregnated with resin, a sizing step of passing the unwound reinforcing fiber through a sizing liquid and coating the sizing liquid on the reinforcing fiber, and a winding step of winding the reinforcing fiber coated with the sizing liquid on a mandrel.

SUMMARY

As disclosed in JP 2017-104547 A and the like, a method of recycling reinforcing fibers from a fiber-reinforced resin (hereinafter, also referred to as a resin-impregnated fiber bundle) has been studied. In the method of recycling reinforcing fibers, a winding end of the resin-impregnated fiber bundle is peeled off from a tank surface using a scraper or the like, and the peeled end is fixed to a winding roller and drawn by driving the roller to rotate.

However, there may be a case where, when the winding end of the resin-impregnated fiber bundle is peeled off from the surface, it is difficult to peel off the resin-impregnated fiber bundle containing the reinforcing fiber bundle cleanly.

This problem will be described in detail with reference to FIGS. 1 to 3. In a tank of the related art, generally, the winding end of the resin-impregnated fiber bundle is cured or solidified and fixed in a state of being affixed to the resin-impregnated fiber bundle located below without being folded, as shown in FIG. 1. The winding end of the resin-impregnated fiber bundle is peeled off by inserting a tool such as a scraper between the winding end and the resin-impregnated fiber bundle located below the winding end. However, there may be a case where, because of the configuration in which the terminal end of the reinforcing fiber is exposed at or close to the terminal end of the winding end, the tool cannot be completely inserted therebetween, and as shown in FIG. 2, only the upper portion of the reinforcing fiber bundle is peeled off and the lower side is left (a tear in an up-down direction). Further, there may be a case where, as shown in FIG. 3, the reinforcing fiber bundle is torn in a right-left direction (a tear in the right-left direction), in addition to that the reinforcing fiber bundle is torn into the upper side and the lower side. When the resin impregnated fiber bundle is drawn in a state where the tear is present, the resin-impregnated fiber bundle is peeled off from the tank surface while the reinforcing fiber bundle is torn, which may result in problems, for example, the reinforcing fiber cannot be collected on a bobbin accurately, a breakage occurs on the reinforcing fiber, or the workabillity is degraded.

On the basis of the above, an object of the present disclosure is to provide a tank in which a winding end of a resin-impregnated fiber bundle can be easily peeled off.

One aspect of the present embodiment is as follows.

(1) A tank includes a liner and a first protective layer, the first protective layer being disposed on an outer peripheral surface of the liner and configured such that a resin-impregnated fiber bundle containing a reinforcing fiber bundle and a first matrix resin is wound around the liner.

A folded portion that is fixed in a state where the resin-impregnated fiber bundle is folded is provided at a winding end of the resin-impregnated fiber bundle.

(2) In the tank according to (1), the folded portion spans both longitudinal sides of the resin-impregnated fiber bundle.

(3) In the tank according to (1) or (2), the resin-impregnated fiber bundle is folded such that a folding direction differs from a winding direction.

(4) In the tank according to (3), when the folded portion is viewed in a radial direction from an outside of the tank, a folding angle between a longitudinal direction of a portion of the resin-impregnated fiber bundle forward of the folded portion and a longitudinal direction of a portion of the resin-impregnated fiber bundle rearward of the folded portion is more than 1 degree and less than 180 degrees.

(5) In the tank according to (4), the folding angle is 1 degree or more and 150 degrees or less, and for example, 10 degrees or more and 120 degrees or less, or 20 degrees or more and 90 degrees or less.

(6) In the tank according to (1) or (2), the resin-impregnated fiber bundle is folded such that a folding direction is consistent with a winding direction.

(7) In the tank according to (6), when the folded portion is viewed in a radial direction from an outside of the tank, a folding angle between a longitudinal direction of a portion of the resin-impregnated fiber bundle forward of the folded portion and a longitudinal direction of a portion of the resin-impregnated fiber bundle rearward of the folded portion is less than 1 degree.

(8) In the method according to any one of (1) to (7), a different material from the resin-impregnated fiber bundle is disposed and interposed between a portion of the resin-impregnated fiber bundle forward of the folded portion and a portion of the resin-impregnated fiber bundle rearward of the folded portion.

(9) In the tank according to (8), the different material is ring-shaped or plate-shaped.

(10) In the tank according to any one of (11) to (9), the reinforcing fiber bundle is a glass fiber bundle or a carbon fiber bundle.

(11) In the tank according to (10), the reinforcing fiber bundle is the glass fiber bundle.

(12) The tank according to (11) further includes a reinforcing layer.

The first protective layer is configured such that a resin-impregnated glass fiber bundle containing the glass fiber bundle and the first matrix resin is wound around the liner, and the reinforcing layer is provided between the first protective layer and the liner, the reinforcing layer configured such that a resin-impregnated carbon fiber bundle containing the carbon fiber bundle and a second matrix resin is wound around the liner.

(13) In the tank according to (12), a folded portion that is fixed in a state where the resin-impregnated carbon fiber bundle is folded is provided at a winding end of the resin-impregnated carbon fiber bundle.

(14) The tank according to any one of (1) to (13) further includes a second protective layer that is provided on the first protective layer and composed of the first matrix resin.

(15) A method of recycling a reinforcing fiber includes:
- a step of preparing the tank according to any one of (1) to (14);
- a step of peeling off the folded portion at the winding end from a surface of the tank; and
- a step of pulling off the winding end that is peeled and drawing the resin-impregnated fiber bundle.

According to the present disclosure, it is possible to provide the tank in which the winding end of the resin-impregnated fiber bundle can be easily peeled off.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
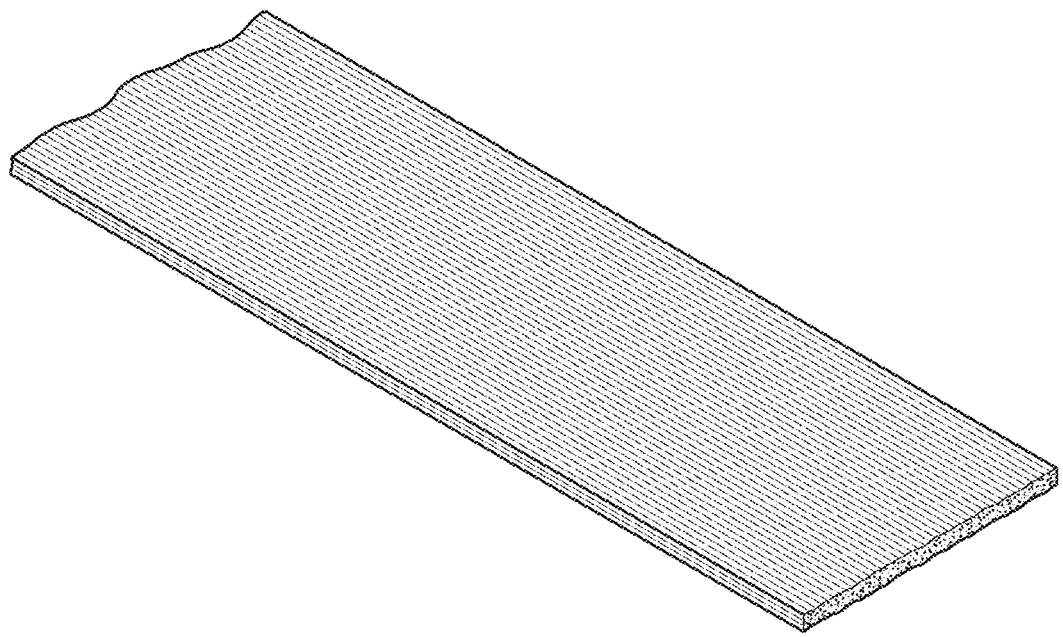
FIG. 1 is a schematic view showing a form of a winding end portion in which a winding end portion of a resin-impregnated fiber bundle is fixed by being cured or solidified without being bent, as in a conventional tank.
Figure 2:
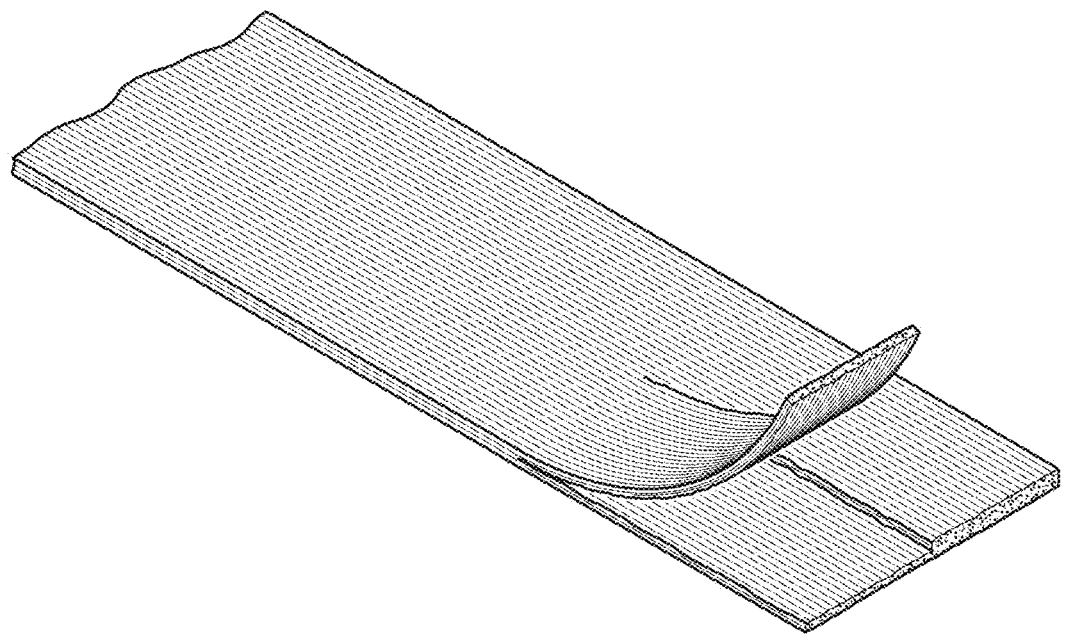
FIG. 2 is a schematic view for explaining a problem of vertical tearing of a fiber bundle that may occur when a winding end portion having a form as shown in FIG. 1 is peeled off using an instrument such as a scraper.
Figure 3:
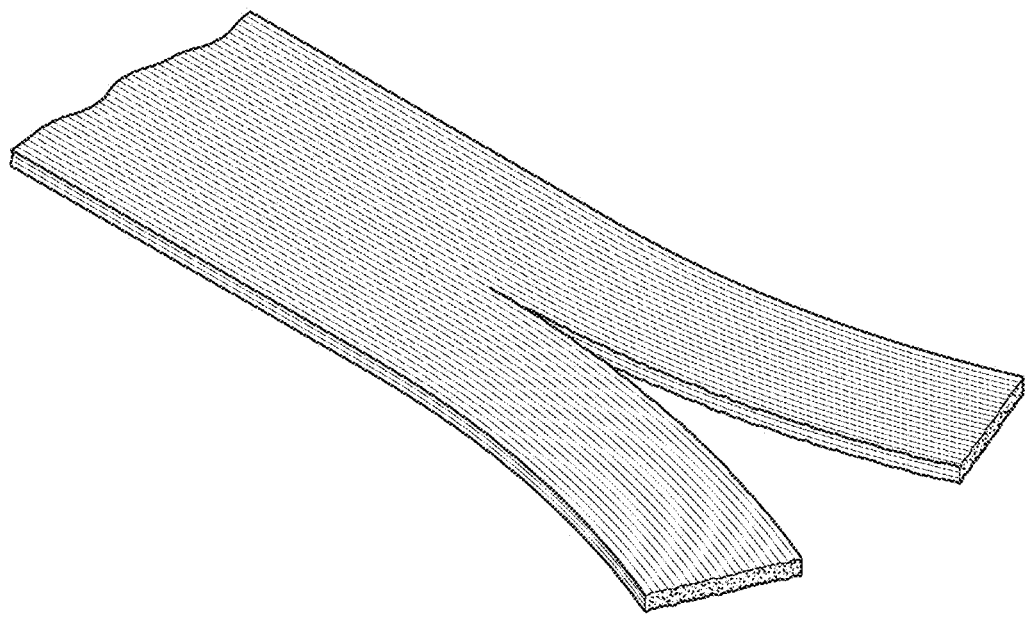
FIG. 3 is a schematic diagram for explaining a problem of a tear in the left-right direction of a fiber bundle that may occur when a winding end portion having a form as shown in FIG. 1 is peeled off using an instrument such as a scraper.

The present embodiment is a tank having a liner and a first protective layer disposed on an outer peripheral surface of the liner and configured such that a resin-impregnated fiber bundle including a reinforcing fiber bundle and a first matrix resin is wound around the liner, wherein the resin-impregnated fiber bundle has a folded portion fixed in a bent state at a winding end portion of the resin-impregnated fiber bundle.

According to the present embodiment, it is possible to provide a tank capable of easily peeling off the winding end portion of the resin-impregnated fiber bundle. Specifically, the tank according to the present embodiment has a folded portion in which the resin-impregnated fiber bundle is fixed in a bent state at a winding end portion of the resin-impregnated fiber bundle, and therefore, by inserting a device such as a scraper between the folded portion and the layer below the folded portion, it is possible to easily peel off the winding end portion from the folded portion.

The reinforcing fibers used in the reinforcing fiber bundle of the resin-impregnated fiber bundle (fiber-reinforced resin layer) are not particularly limited, and examples thereof include inorganic fibers such as glass fibers, carbon fibers, metal fibers, and alumina fibers, synthetic organic fibers such as aramid fibers, and natural organic fibers such as cotton. These fibers may be used singly or in combination (as a mixed fiber).

The first matrix resin used in the resin-impregnated fiber bundle is not particularly limited, but, for example, phenolic resin, urea resin, unsaturated polyester resin, vinyl ester resin, polyimide resin, bismaleimide resin, polyurethane resin, dialylphthalate resin, epoxy resin, or a mixture thereof.

Examples of the first matrix resin include a thermosetting resin and a thermoplastic resin. The first matrix resin is preferably a thermosetting resin. As a thermosetting resin, for example, epoxy resins, epoxy-modified polyurethane resins, polyester resins, phenol resins, polyurethane resins, or thermosetting polyimide resins, and the like. Examples of the epoxy resin include, but are not limited to, bisphenol A type epoxy resin, bisphenol AD type epoxy resin, bisphenol F type epoxy resin, phenol novolac type epoxy resin, cresol novolac type epoxy resin, and glycidyl ester type epoxy resin. The epoxy resin may be linear or branched. One kind of the first matrix resin may be used alone, or two or more kinds thereof may be used in combination.

The resin-impregnated fiber bundle used for forming the layer (fiber-reinforced resin layer) composed of the resin-impregnated fiber bundle can be prepared by a method conventionally known in the art. The resin-impregnated fiber bundle is not particularly limited, and can be prepared, for example, by prepreg molding in which a reinforcing fiber bundle is impregnated with a liquid resin.

The method of winding the resin-impregnated fiber bundle can be carried out by a conventionally known method. For example, a filament winding apparatus known in the art can be used for winding a resin-impregnated fiber bundle. In the filament winding device, the resin-impregnated fiber bundle can be repeatedly wound around the outer periphery of the mold, and a fiber layer formed by the resin-impregnated fiber bundle can be formed around the outer periphery of the mold. When a thermosetting resin (for example, an epoxy resin) is used as the resin, a fiber layer impregnated with the epoxy resin as a fiber layer is formed on the outer periphery of the mold. Thereafter, the resin is cured by heating or the like. Although the number of turns is not limited, the resin-impregnated fiber bundle is wound until the thickness of the fiber layers formed on the outer periphery of the mold is usually 10 mm to 30 mm. After winding, the resin-impregnated fiber is cured by appropriate heat treatment to obtain a fiber-reinforced resin layer. As the heat treatment, for example, a thermosetting furnace can be used.

The tank according to the present embodiment has a folded portion in which the resin-impregnated fiber bundle is fixed in a bent state at a winding end portion of the resin-impregnated fiber bundle. In the present embodiment, the folded portion means an end caused by the bending of the resin-impregnated fiber bundle.

Figure 4:
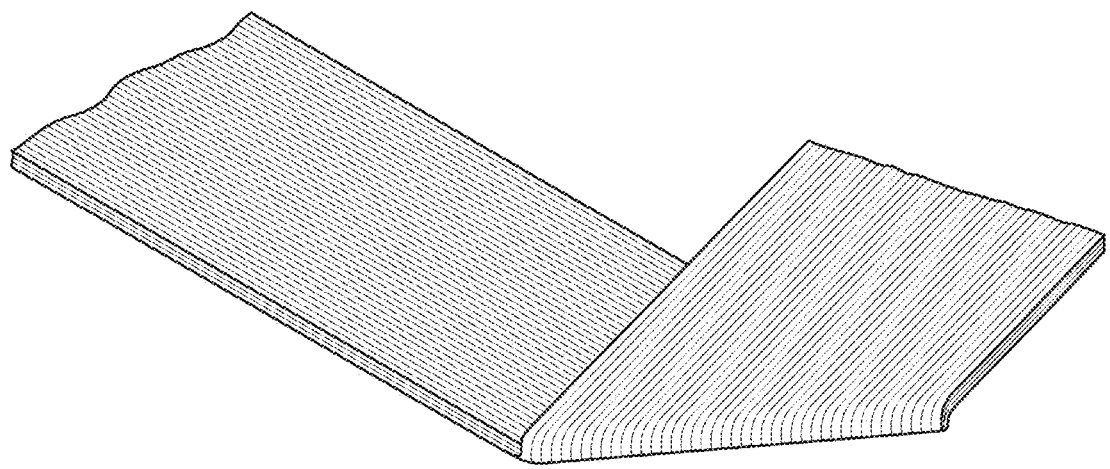
FIG. 4 is a schematic view showing a form in which the resin-impregnated fiber bundle at a portion after the folded portion is bent and fixed so as to be on the resin-impregnated fiber bundle at a portion before the folded portion.
Figure 5:
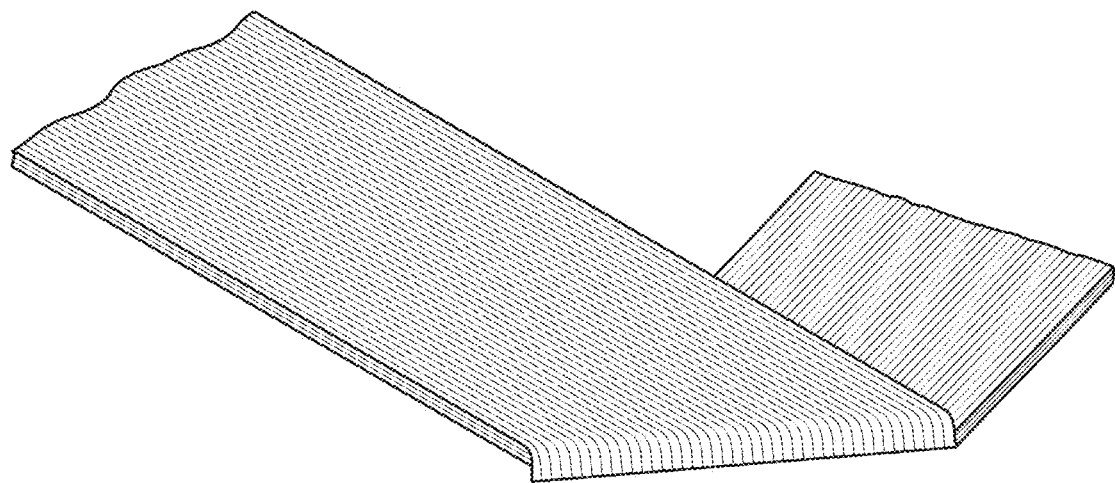
FIG. 5 is a schematic view showing a configuration in which the resin-impregnated fiber bundle at a portion after the folded portion is bent and fixed so as to be below the resin-impregnated fiber bundle at a portion before the folded portion.

In the conventional tank, the winding end portion of the resin-impregnated fiber bundle is not bent in particular as in the present embodiment, and is fixed by being cured or solidified in a state of being attached to the surface of a layer (fiber-reinforced resin layer) made of the resin-impregnated fiber bundle (FIG. 1). In FIG. 1, only the winding end of the resin-impregnated fiber bundle is shown, and the underlying layer, specifically the resin-impregnated fiber bundle, is omitted. In addition, since the tank usually has a curved surface, the winding end portion of the resin-impregnated fiber bundle is fixed along the phase. On the other hand, in the tank according to the present embodiment, the winding end portion of the resin-impregnated fiber bundle is cured or solidified and fixed in a bent state. The bent state, the resin-impregnated fiber bundle of the rear portion from the folded portion (the tip end portion of the winding end portion) may be bent so as to be on the resin-impregnated fiber bundle of the front portion from the folded portion (the portion wound first, the portion opposite to the tip end side of the winding end portion), the resin-impregnated fiber bundle of the rear portion from the folded portion may be bent so as to be below the resin-impregnated fiber bundle of the front portion from the folded portion. FIG. 4 is a schematic view showing a form in which the resin-impregnated fiber bundle at a portion after the folded portion is bent and fixed so as to be on the resin-impregnated fiber bundle at a portion before the folded portion. FIG. 5 is a schematic view showing a form in which the resin-impregnated fiber bundle at a portion after the folded portion is bent and fixed so as to be under the resin-impregnated fiber bundle at a portion before the folded portion.

A form in which the resin-impregnated fiber bundle is fixed in a folded state is not particularly limited, and examples thereof include a form in which the resin impregnated in the reinforcing fiber bundle in a folded state is cured or solidified and fixed. The fixing can be performed, for example, by performing a heat treatment in a state in which the winding end portion is bent, and then curing. For example, hot air may be blown into the vicinity of the winding end portion in a state in which the winding end portion is bent, and may be cured.

As described above, when the reinforcing fibers are recycled from the resin-impregnated fiber bundle, in order to fix the end portion to the winding roller, first, the winding end portion of the resin-impregnated fiber bundle is peeled from the tank surface using a device such as a scraper. At this time, as in the present embodiment, by fixing the resin-impregnated fiber bundle in a bent state at the winding end portion of the resin-impregnated fiber bundle, between the folded portion and the resin-impregnated fiber bundle located below the folded portion at the winding end portion, it is easy to insert a device such as a scraper. This is because the folded portion formed by bending and fixing the resin-impregnated fiber bundle functions as a guide between the winding end portion of the portion to be peeled and the resin-impregnated fiber bundle existing thereunder when inserting a device such as a scraper, the resin-impregnated fiber bundle from the folded portion can be easily peeled by suppressing the occurrence of tearing.

In the present embodiment, the folded portion preferably extends along both longitudinal sides of the resin-impregnated fiber bundle. That is, it is preferable that the end side formed by bending the resin-impregnated fiber bundle reaches two (both sides) longitudinal sides of the resin-impregnated fiber bundle. By bending the resin-impregnated fiber bundle so as to cover both longitudinal sides of the resin-impregnated fiber bundle, it is possible to more effectively suppress the tearing of the fiber bundle when the winding end portion of the resin-impregnated fiber bundle is peeled from the folded portion.

Figure 6:
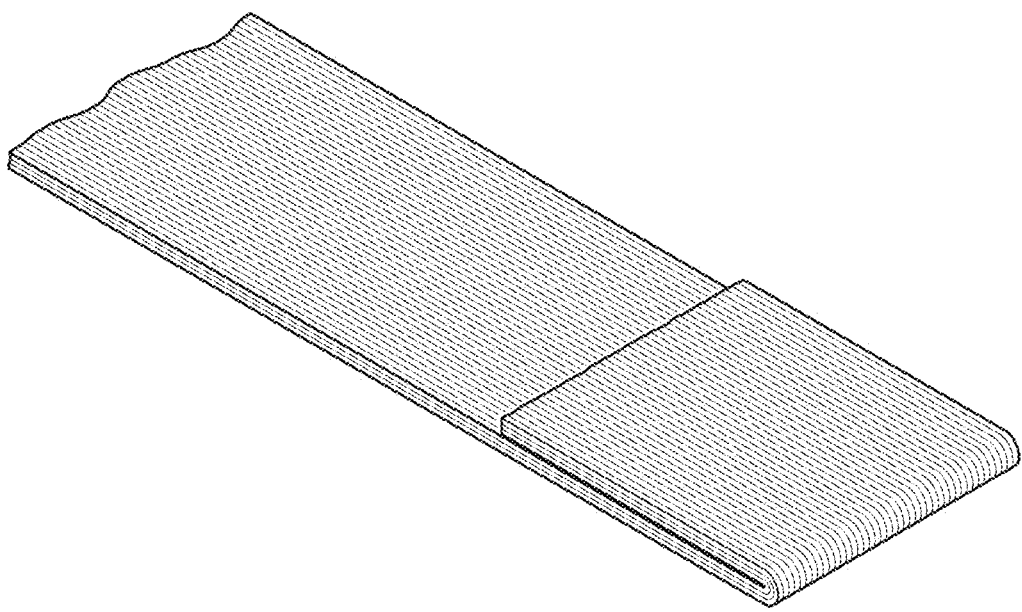
FIG. 6 is a schematic view showing a form in which the resin-impregnated fiber bundle at a portion after the folded portion is folded and fixed so as to be on the resin-impregnated fiber bundle at a portion before the folded portion.
Figure 7:
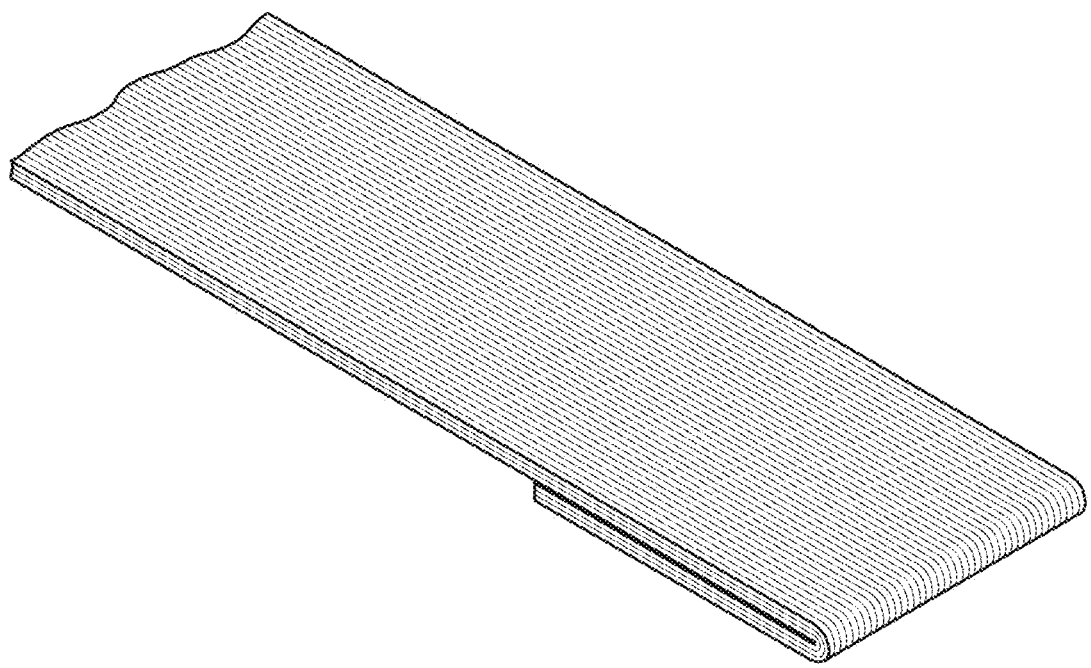
FIG. 7 is a schematic view showing a form in which the resin-impregnated fiber bundle at a portion after the folded portion is folded back and fixed so as to be under the resin-impregnated fiber bundle at a portion before the folded portion.

In the present embodiment, as shown in FIGS. 4 and 5, it is preferable that the resin-impregnated fiber bundle is bent so that the folding direction is different from the winding direction. Further, in the present embodiment, the winding end portion of the resin-impregnated fiber bundle may be fixed in a folded state. In the present specification, the term "folded state" means a state in which both longitudinal sides of the resin-impregnated fiber bundle at a portion after the folded portion are bent so as to coincide with both longitudinal sides of the resin-impregnated fiber bundle at a portion before the folded portion, and is a term indicating an aspect of a form in which the resin-impregnated fiber bundle is "bent". FIG. 6 is a schematic view showing a form in which the resin-impregnated fiber bundle at a portion after the folded portion is folded and fixed so as to be on the resin-impregnated fiber bundle at a portion before the folded portion. FIG. 7 is a schematic view showing a form in which the resin-impregnated fiber bundle at a portion after the folded portion is folded and fixed so as to be under the resin-impregnated fiber bundle at a portion before the folded portion.

Figure 8:
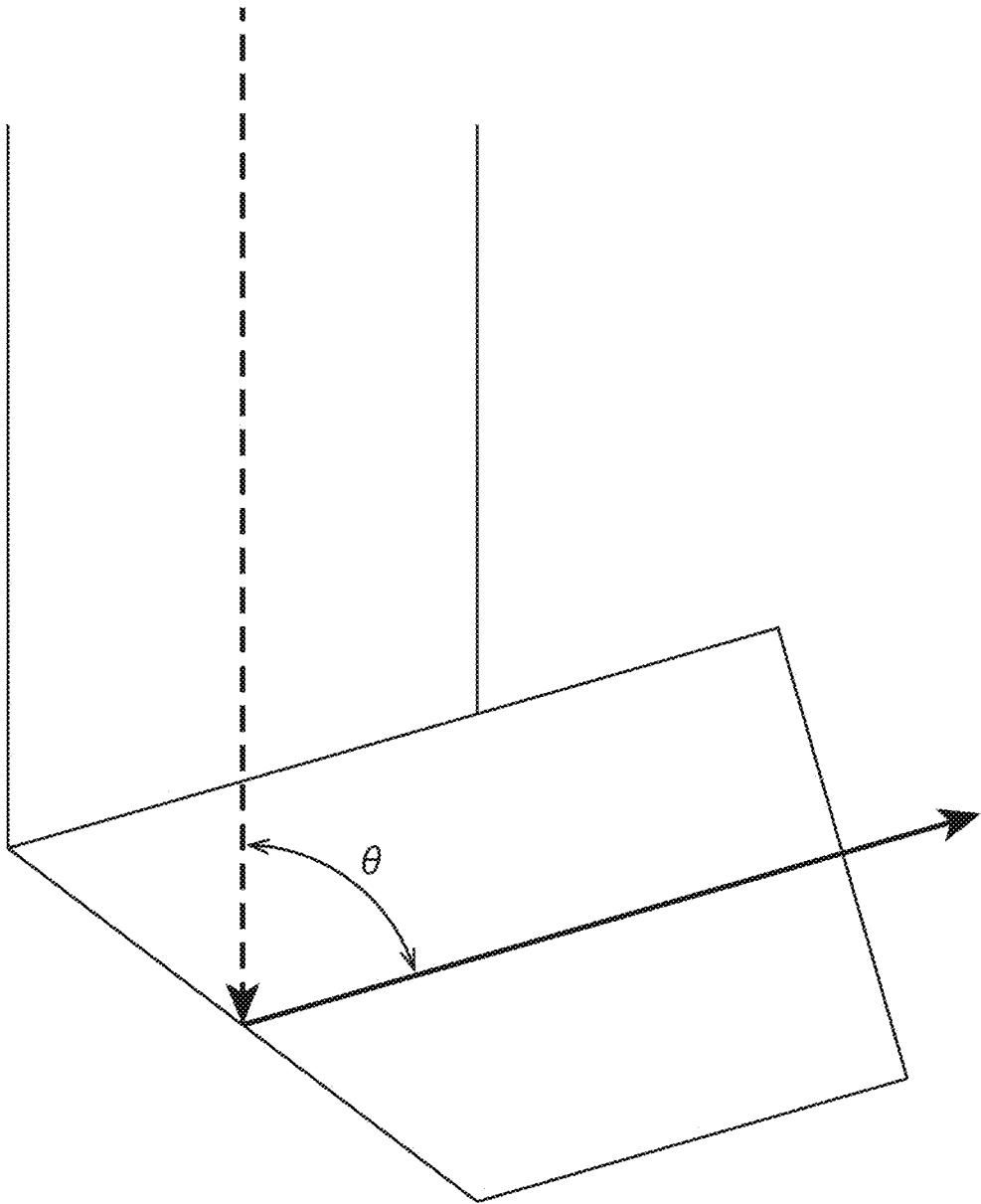
FIG. 8 is a schematic diagram for explaining the folding angle θ, and is a schematic diagram when the folded portion is viewed in the radial direction from the outside of the tank.

FIG. 4 and FIG. 5 are schematic views showing a configuration in which the resin-impregnated fiber bundle is bent so that the folding direction is different from the winding direction. FIG. 8 is a schematic view for explaining the folding angle, and is a schematic view when a folded portion is viewed in the radial direction from the outside of the tank. In FIG. 8, the folding angle between the longitudinal direction (dotted line arrow) of the resin-impregnated fiber bundle at a portion before the folded portion and the longitudinal direction (solid line arrow) of the resin-impregnated fiber bundle at a portion after the folded portion is indicated by θ. In the present embodiment, it is preferable that the folding direction is different from the winding direction to mean that the folding angle θ between the longitudinal direction of the resin-impregnated fiber bundle at a portion before the folded portion and the longitudinal direction of the resin-impregnated fiber bundle at a portion after the folded portion is more than 1 degree and less than 180 degrees. In the present embodiment, the folding angle θ between the longitudinal direction of the resin-impregnated fiber bundle at a portion before the folded portion and the longitudinal direction of the resin-impregnated fiber bundle at a portion after the folded portion is preferably 1 degree or more, preferably 5 degrees or more, preferably 10 degrees or more, preferably 15 degrees or more, and preferably 20 degrees or more. The folding angle is preferably 150 degrees or less, preferably 120 degrees or less, preferably 90 degrees or less, and preferably 80 degrees or less. The upper limit value and/or the lower limit value of each of these numerical ranges can be arbitrarily combined to define a preferable range. For example, the folding angle is 1 degree or more and 150 degrees or less, 10 degrees or more and 120 degrees or less, or 20 degrees or more and 90 degrees or less.

FIG. 6 and FIG. 7 are schematic views showing a configuration in which the resin-impregnated fiber bundle is bent so that the folding direction is the same as the winding direction. In the present embodiment, the term "the folding direction is the same as the winding direction" preferably means that the folding angle θ between the longitudinal direction of the resin-impregnated fiber bundle at a portion before the folded portion and the longitudinal direction of the resin-impregnated fiber bundle at a portion after the folded portion is less than 1 degree.

In addition, the folding angle θ may be defined as an angle between a plane passing through a center line (a line along a dotted line arrow in FIG. 8) in the short-side direction of the resin-impregnated fiber bundle at the front portion (the immediately preceding portion) of the folded portion and being perpendicular to the axis of the tank (a chain line X in FIG. 9), and a plane passing through a center line (a line along a solid line arrow in FIG. 8) in the short-side direction of the resin-impregnated fiber bundle at a portion after the folded portion and being perpendicular to the axis of the tank. The preferred numerical ranges are applicable to the ranges described above.

The length of the resin-impregnated fiber bundle after the folded portion is not particularly limited as to the length to be bent, but is 300 mm from 10 mm, for example.

In the present embodiment, in the folded portion, a material different from the resin-impregnated fiber bundle may be sandwiched between the resin-impregnated fiber bundle at a portion before the folded portion and the resin-impregnated fiber bundle at a portion after the folded portion. The shape of another material may be, for example, a ring shape or a plate shape. By adopting such a form, another material may be a starting point for peeling off.

Figure 20:
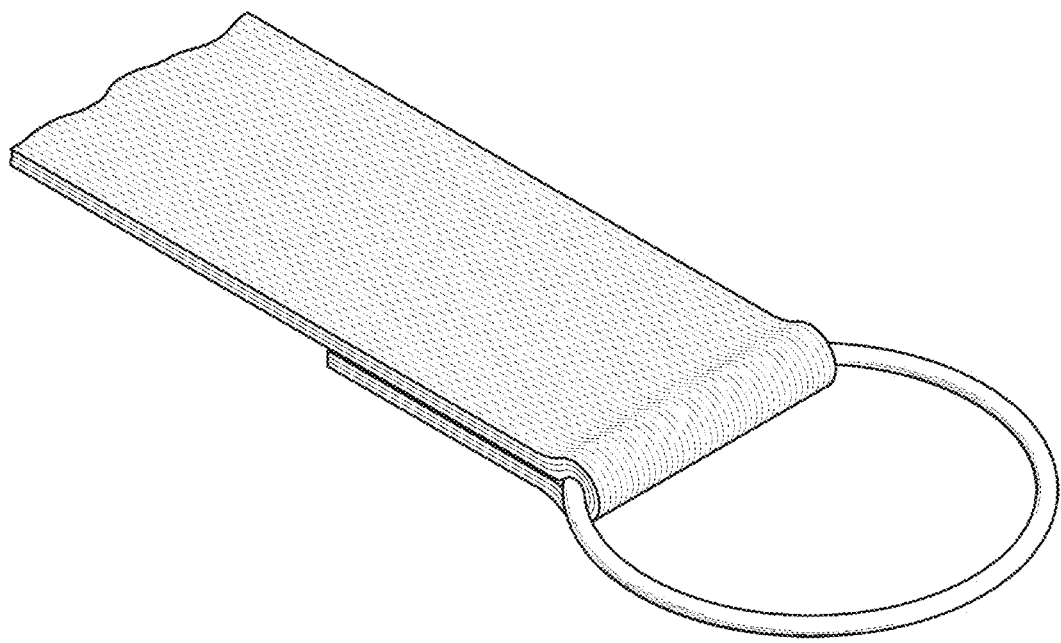
FIG. 20 is a schematic view showing a configuration in which another ring-shaped material is sandwiched between a resin-impregnated fiber bundle at a portion before the folded portion and a resin-impregnated fiber bundle at a portion after the folded portion.

FIG. 20 is a schematic view showing a configuration in which, in the configuration described in FIG. 7, the resin-impregnated fiber bundle at a portion after the folded portion is folded and fixed so as to be under the resin-impregnated fiber bundle at a portion before the folded portion, another ring-shaped material is sandwiched between the resin-impregnated fiber bundle at a portion before the folded portion and the resin-impregnated fiber bundle at a portion after the folded portion. In FIG. 20, another material has a ring shape, and a portion of another material having a ring shape is sandwiched and fixed at a folded portion.

Figure 21:
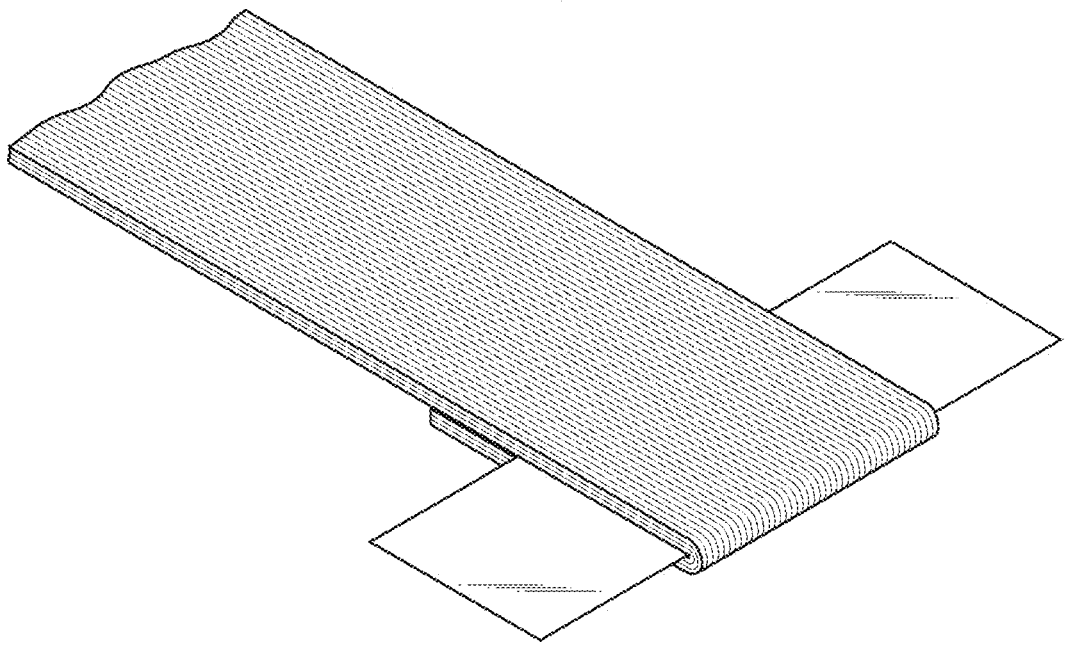
FIG. 21 is a schematic view showing a configuration in which another plate-shaped material is sandwiched between a resin-impregnated fiber bundle at a portion before the folded portion and a resin-impregnated fiber bundle at a portion after the folded portion.

FIG. 21 is a schematic view showing a configuration in which, in the configuration described in FIG. 7, the resin-impregnated fiber bundle at a portion after the folded portion is folded back and fixed so as to be under the resin-impregnated fiber bundle at a portion before the folded portion, another plate-shaped material is sandwiched between the resin-impregnated fiber bundle at a portion before the folded portion and the resin-impregnated fiber bundle at a portion after the folded portion. In FIG. 21, another material has a plate shape, and a part of another material having a plate shape is sandwiched between folded portions and fixed.

Figure 22:
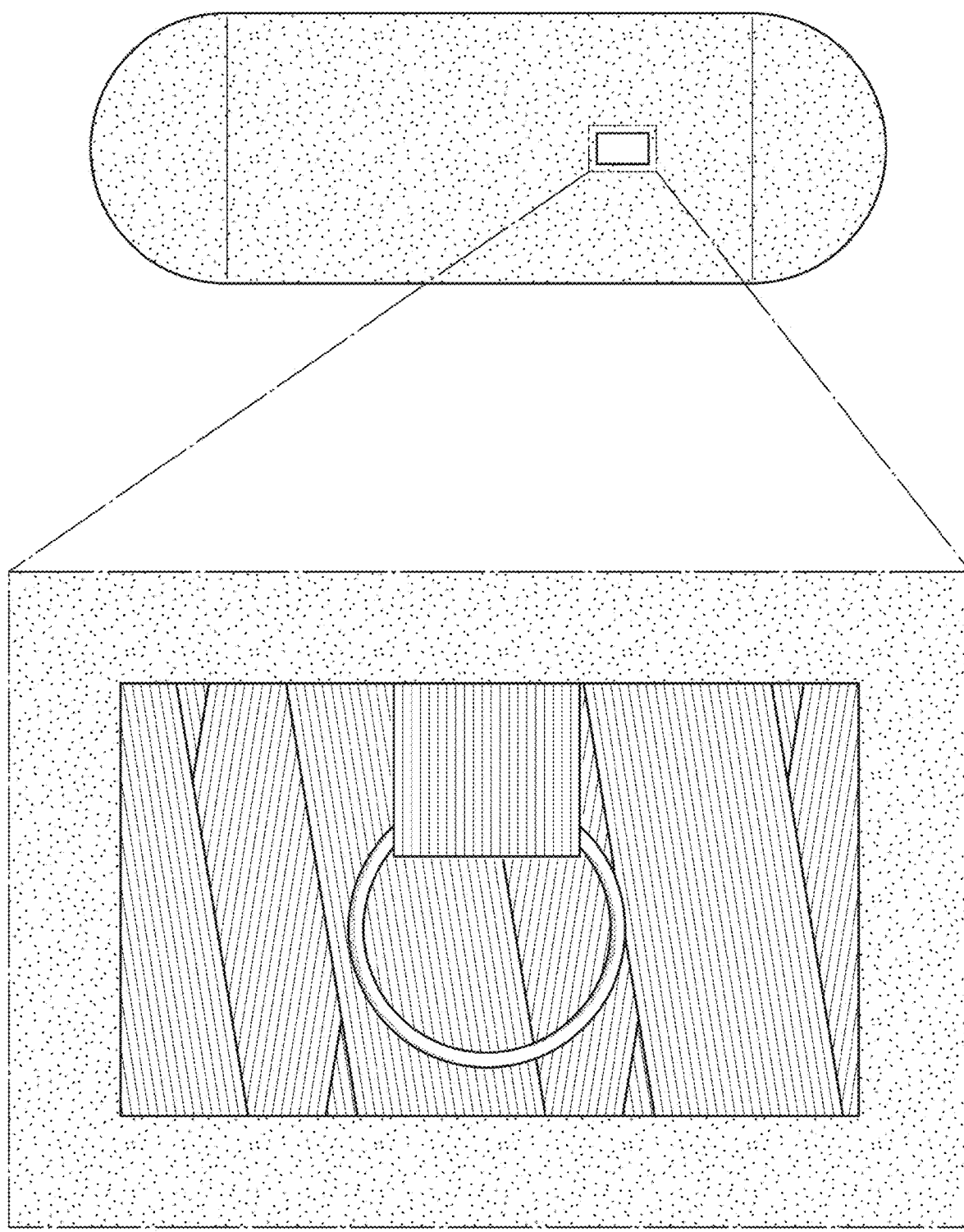
FIG. 22 is a schematic view showing a state in which a surface layer is partially removed and a winding end portion is exposed in a tank employing a form in which another ring-shaped material is fixed to a folded portion.
Figure 23:
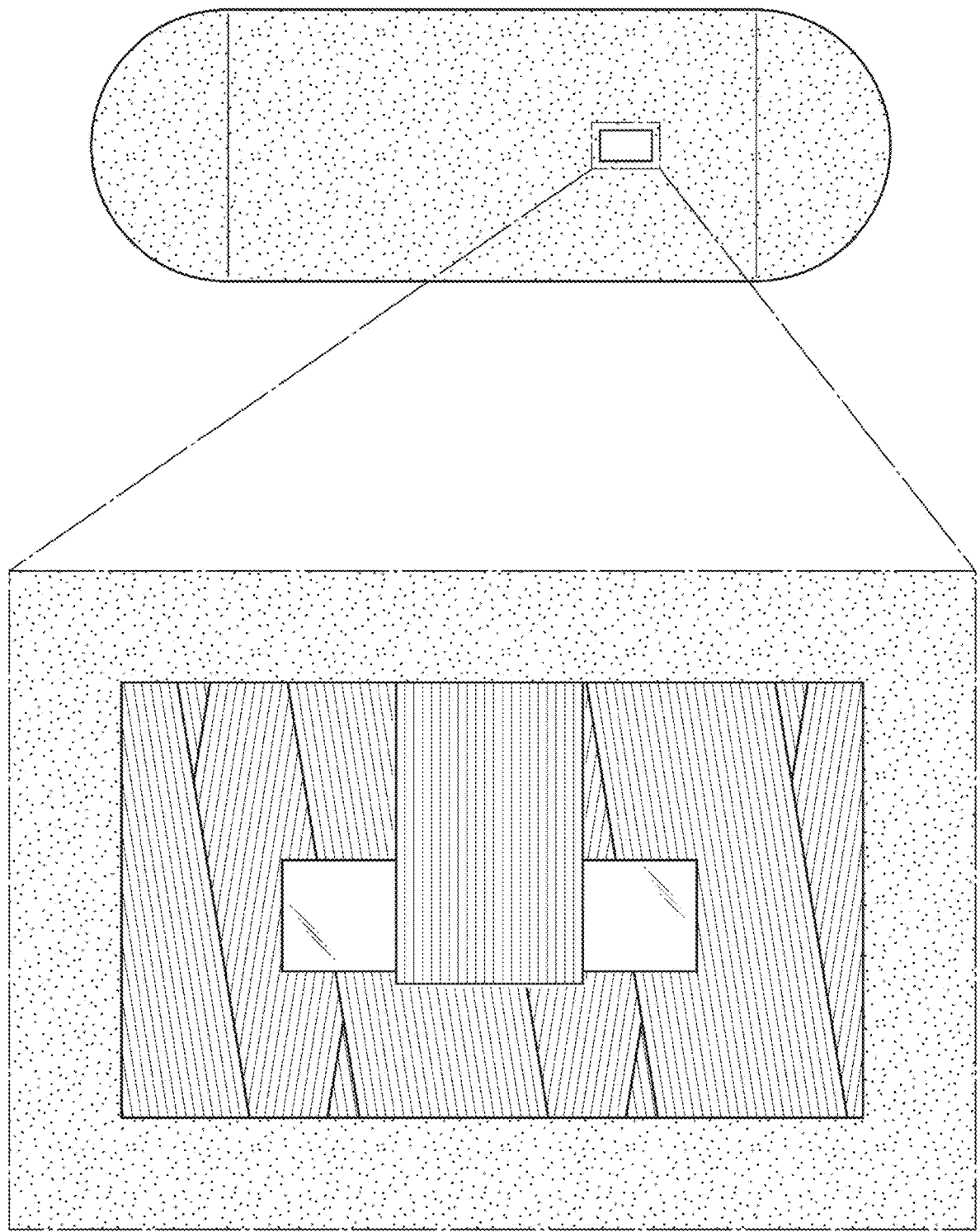
FIG. 23 is a schematic view showing a state in which a surface layer is partially removed and a winding end portion is exposed in a tank adopting a form in which another plate-shaped material is fixed to a folded portion.

FIG. 22 and FIG. 23 are schematic diagrams illustrating a state in which a surface layer is partially removed and a winding end portion is exposed in a tank adopting a configuration in which another ring-shaped material (FIG. 22) of FIG. 20 or another plate-shaped material (FIG. 23) of FIG. 21 is fixed to a folded portion. As shown in FIGS. 22 and 23, when pulling out a resin-impregnated glass fiber bundle for recycling, by using another member as a starting point of peeling, while suppressing the occurrence of cracks, it is possible to easily peel off the winding end portion.

As a material of another material, a material that does not cause deformation or deterioration when heated at 250° C. is desirable, and examples thereof include a metal material such as aluminum or iron. Further, the thickness of the other material is preferably thinner in order to suppress the occurrence of unevenness of the tank.

Hereinafter, an embodiment according to the present embodiment will be described in detail.

Hereinafter, a configuration example of a tank according to the present embodiment will be described with reference to FIG. 9. Note that the following configuration example shows one embodiment of the embodiment, and the present embodiment is not intended to be limited by the description of the following configuration example.

Figure 9:
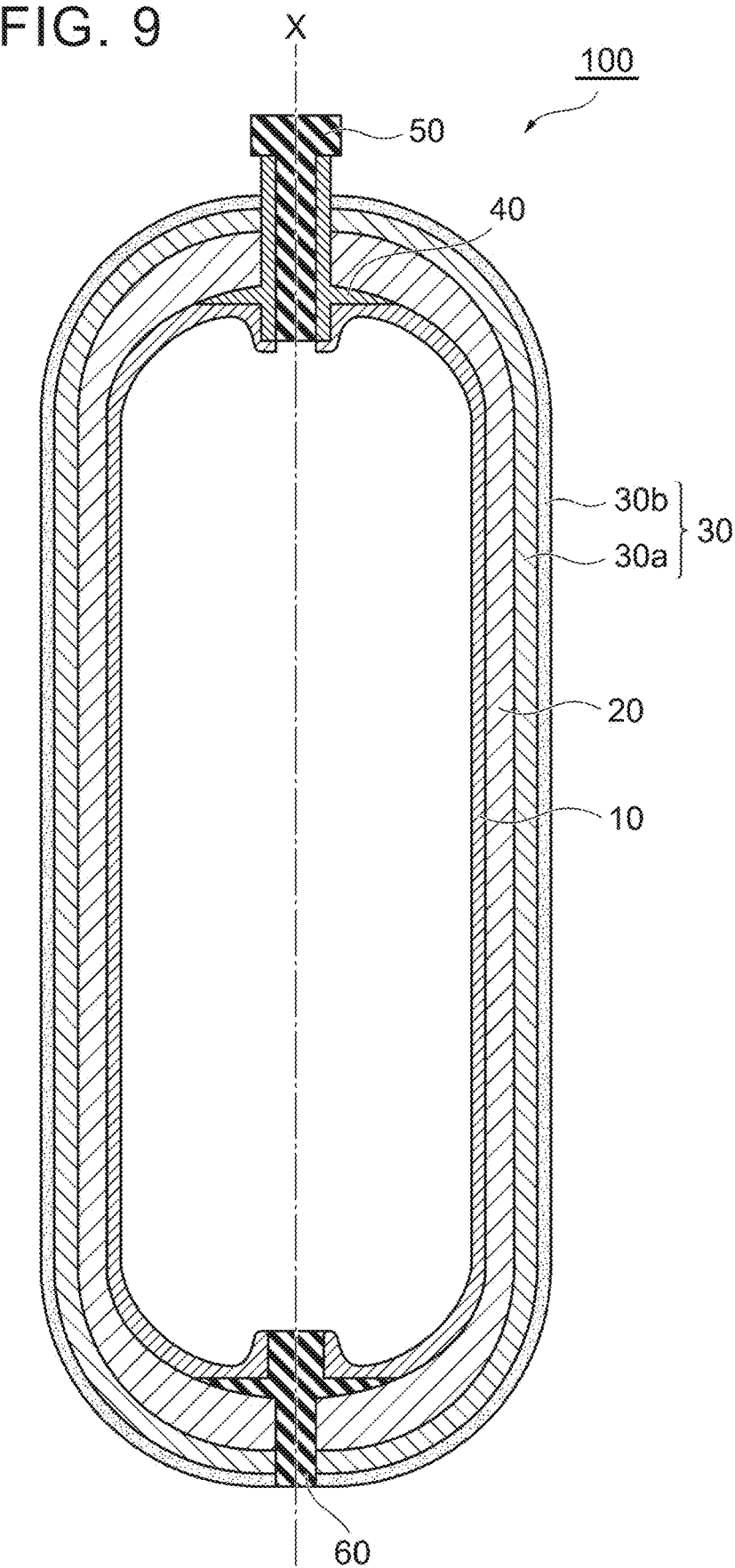
FIG. 9 is a schematic cross-sectional view showing a configuration example of a tank 100 as an embodiment according to the present embodiment, and is a cross-sectional view taken along an axial direction.

FIG. 9 is a cross-sectional view illustrating a configuration example of a tank 100 according to an embodiment of the present disclosure. FIG. 9 shows a cross-sectional view taken along a plane parallel to and through the central axis of the tank 100. The central axis (dotted line X) of the tank 100 coincides with the axis passing through the center of the circle of the tank body having a substantially cylindrical shape. The tank 100 can be used to fill a gas such as, for example, compressed hydrogen. For example, the tank 100 is mounted on a fuel cell electric vehicle for supplying hydrogen to the fuel-cell with compressed hydrogen.

FIG. 9 is a schematic cross-sectional view along the axial direction of the tank 100 according to the present embodiment. The tank 100 is a hollow container centered on the central axis X, and is a pressure container for storing a high-pressure fluid such as high-pressure hydrogen gas or high-pressure natural gas. As shown in FIG. 9, the tank 100 includes at least a resin liner 10 containing a gas, a reinforcing layer 20 covering the outer peripheral surface of the liner 10, and a protective layer 30 covering the outer peripheral surface of the reinforcing layer 20. At both ends of the tank 100, a valve-side base 40 and an end-side base 60 are provided, respectively. A valve 50 is attached to the valve-side base 40.

The liner 10 includes a body portion and two side ends, and forms an internal space for storing gas, and has a gas barrier property that seals the internal space so that gas such as hydrogen does not leak to the outside. The body portion is a cylindrical portion extending along the central axis X of the tank 100 shown in FIG. 9 and having a predetermined length. The side end portion is a dome-shaped portion formed continuously on both sides of the body portion, and each side end portion is reduced in diameter as it moves away from the body portion, and an opening portion is formed in the center of the most reduced diameter portion, and the valve-side base 40 and the end-side base 60 are provided in each opening portion.

The liner 10 is formed of a resin having gas barrier properties. Examples of such resins include polyethylene resins, polypropylene resins, nylon resins, and the like. As the resin, one kind may be used alone, or two or more kinds may be used in combination. Further, the liner 10 may be formed by mixing a gas impermeable material such as a hydrogen storage alloy into the above-described resin.

The reinforcing layer 20 is formed of a resin-impregnated carbon fiber bundle (carbon fiber-reinforced resin (CFRP)) including a carbon fiber bundle and a second matrix resin. The reinforcing layer 20 is configured such that the resin-impregnated carbon fiber bundle including the carbon fiber bundle and the second matrix resin is wound around the liner. The reinforcing layer 20 may be formed, for example, by winding the fibers of the resin-impregnated carbon fiber bundle around the outer peripheral surface of the liner 10 by hoop winding and/or helical winding. The layer (carbon fiber-reinforced resin layer) 20 made of a resin-impregnated carbon fiber bundle mainly has a function of reinforcing the liner 10 (reinforcing layer). Examples of the second matrix resin impregnated into the carbon fiber bundle include a thermosetting resin and a thermoplastic resin. Carbon fibers can be prepared by methods conventionally known in the art. The carbon fiber may be any material containing carbon as a main component, and examples thereof include a carbon fiber containing acrylic as a raw material, a carbon fiber containing pitch as a raw material, and a carbon fiber containing polyvinyl alcohol as a raw material. Among these, PAN carbon-based fibers produced using polyacrylonitrile fibers as a raw material are preferable.

The protective layer 30 is composed of the first protective layer 30a and the second protective layer 30b. The first protective layer 30a is formed of a resin-impregnated glass fiber bundle (glass fiber-reinforced resin (GFRP)) in which the glass fiber bundle is a reinforcing fiber bundle, and the resin-impregnated fiber bundle including the glass fiber bundle and the first matrix resin is wound around the liner. Specifically, the first protective layer 30a is formed by winding the glass fibers of the resin-impregnated glass fiber bundle on the outer peripheral surface of the reinforcing layer 20 by, for example, helical winding and/or hoop winding. Examples of the first matrix resin impregnated into the glass fiber bundle include a thermosetting resin and a thermoplastic resin.

The protective layer 30 includes a first protective layer 30a that covers the outer peripheral surface of the reinforcing layer 20, and a second protective layer 30b that covers the outer peripheral surface of the first protective layer 30a. The second protective layer 30b may be a layer formed by curing a portion of the first matrix resin impregnated in the glass fiber bundle while bleeding out on the surface of the glass fiber-reinforced resin wound to form the first protective layer 30a in the thermosetting step after the winding end.

The first protective layer 30a is composed of a resin-impregnated fiber bundle composed of fiberglass and a first matrix resin. The first matrix resin included in the first protective layer 30a may be, for example, the same material as the second matrix resin of the reinforcing layer 20. The first matrix resin included in the first protective layer 30a may be of the same material as the second matrix resin included in the reinforcing layer 20, or may be of a different material.

The second protective layer 30b comprises a first matrix resin, which is the main material. As described above, the first matrix resin may have a portion of the first matrix resin impregnated in the glass fiber bundle of the first protective layer 30a protruding from the surface of the first protective layer 30a, and the content of the first matrix resin of the second protective layer 30b is higher than the content of the first matrix resin of the first protective layer 30a, Such a second protective layer 30b may comprise only the first matrix resin and may comprise a portion of the fiberglass separated from the first protective layer 30a.

In FIG. 9, the valve-side base 40 has a substantially cylindrical shape and is fitted and fixed between the liner 10 and the reinforcing layer 20. A substantially cylindrical opening of the valve-side base 40 functions as an opening of the tank 100. In the present embodiment, the valve-side base 40 can be made of, for example, stainless steel, but may be made of another metal such as aluminum, or may be made of resin. The valve 50 has a cylindrical portion formed with an external thread, and the valve 50 closes the opening of the valve-side base 40 by being screwed into the internal thread formed on the inner surface of the valve-side base 40. The end-side base 60 may be made of, for example, aluminum, and is assembled with a portion exposed to the outside, and serves to guide the heat inside the tank to the outside.

The second matrix resin is independent of the first matrix resin, but may be of the same material as the first matrix resin, for example. Examples of the second matrix resin include a thermosetting resin and a thermoplastic resin. The first matrix resin and the second matrix resin may be of the same material or different materials, respectively, as described above. The second matrix resin is preferably a thermosetting resin. Examples of the thermosetting resin include those described above with respect to the first matrix resin. One kind of the second matrix resin may be used alone, or two or more kinds thereof may be used in combination.

The layer (fiber-reinforced resin layer) made of the resin-impregnated fiber bundle can be formed by, for example, a filament winding method. The filament winding molded article can be manufactured by aligning a plurality of reinforcing fiber bundles as necessary, impregnating the reinforcing fiber bundles with a matrix resin, and winding the reinforcing fiber bundles at an appropriate angle while applying tension to a rotating substrate or mold to an appropriate thickness.

Figure 10:
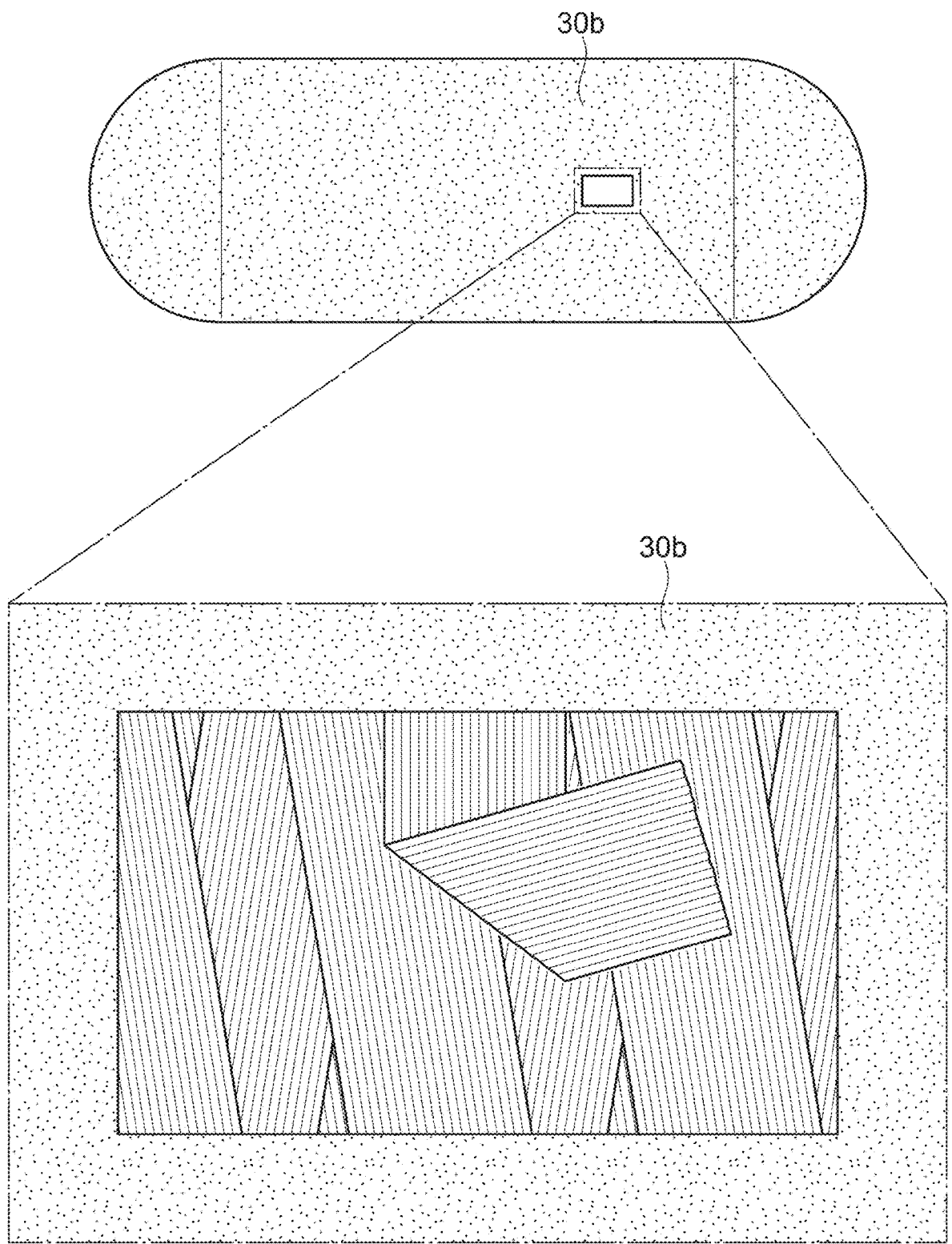
FIG. 10 is a schematic view showing a state in which the second protective layer 30*b* as the front surface layer of the tank 100 shown in FIG. 9 is partially removed and the winding end portion of the first protective layer 30*a* is exposed.

FIG. 10 is a schematic view showing a state in which the second protective layer 30b as the front surface layer of the tank 100 shown in FIG. 9 is partially removed and the winding end portion of the first protective layer 30a is exposed. As shown in FIG. 10, the winding end of the resin-impregnated glass fiber bundles (glass fiber-reinforced resins) constituting the first protective layer 30a is fixed by being cured or solidified while being bent, Therefore, when pulling out the resin-impregnated glass fiber bundle for recycling, by inserting a device such as a scraper between the folded portion and the layer below it, by suppressing the occurrence of tears, it is possible to easily peel off the winding end portion. Further, the winding end portion of the resin-impregnated carbon fiber bundle constituting the reinforcing layer (intermediate layer) 20 may also be cured or solidified and fixed in a bent state. Accordingly, the winding end portion can be easily peeled off even when the resin-impregnated fiber bundle constituting the intermediate layer is pulled out.

As an aspect of the present embodiment, a method of recycling reinforcing fibers from the tank according to the present embodiment is also exemplified. Hereinafter, a recycling method according to the present embodiment will be described.

Figure 11:
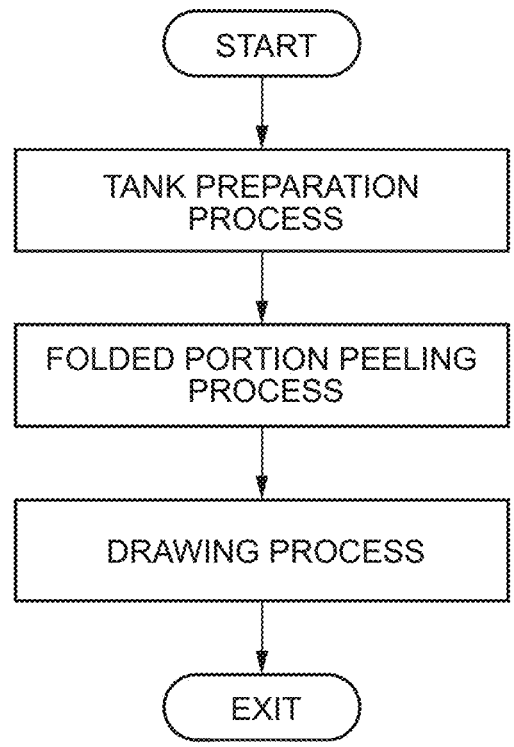
FIG. 11 is an example of a flowchart for describing an embodiment of the method according to the present embodiment.

FIG. 11 shows an example of a flowchart for explaining the method according to the present embodiment. As illustrated in FIG. 11, the present embodiment includes at least a tank preparation step, a folded portion peeling step, and a drawing step. Hereinafter, each step will be described in detail.

Tank Preparation Process

The recycling method according to the present embodiment includes a step of preparing a tank according to the present embodiment. That is, the recycling method according to the present embodiment includes a step of preparing a tank having a folded portion in which the resin-impregnated fiber bundle is fixed in a bent state at a winding end portion of the resin-impregnated fiber bundle.

Examples of the tank to be prepared include a tank that is used for each application after manufacture and then recovered, and a defective product at the manufacturing stage.

Folded Portion Peeling Process

Next, the recycling method according to the present embodiment includes a step of separating the folded portion of the winding end portion from the tank surface.

In the peeling step, as described above, the folded portion is peeled off by inserting an instrument such as a scraper between the folded portion and the layer below the folded portion. At this time, the folded portion formed by bending and fixing the resin-impregnated fiber bundle, when inserting a device such as a scraper, since it functions as a guide between the folded portion and the resin-impregnated fiber bundle existing thereunder, while suppressing the occurrence of tears, it is possible to easily peel the resin-impregnated fiber bundle from the folded portion.

Drawing Process

The recycling method according to the present embodiment includes a step of pulling the peeled winding end portion to draw out the resin-impregnated fiber bundle.

The pulling-out step is preferably a step of pulling out the resin-impregnated fiber bundle while subjecting the tank to heat treatment. The temperature of the heat treatment is preferably equal to or higher than the glass transition temperature of the resin (first matrix resin) and less than the thermal decomposition start temperature, and is preferably lower than the thermal deterioration temperature of the reinforcing fiber.

By the heat treatment, the resin in the resin-impregnated fiber bundle can be softened while suppressing the thermal decomposition of the resin (first matrix resin) and the decrease in the strength of the reinforcing fiber. Since the tank is heated above the glass transition temperature of the resin, the resin in the resin-impregnated fiber bundle softens. The resin-impregnated fiber bundle can be easily pulled out by performing the pulling-out step in a state where the resin is softened. Specifically, the resin-impregnated fiber bundle can be withdrawn from the tank with a smaller tension. By pulling out by a small tension, it is possible to suppress breakage, damage, and the like of reinforcing fibers. Further, the thermal decomposition of the resin can be suppressed by heating the tank at a temperature lower than the thermal decomposition start temperature. By suppressing the thermal decomposition of the resin, excessive deformation and carbonization of the resin can be suppressed, and as a result, the resin in the resin-impregnated fiber bundle can be easily dissolved even when the dissolution treatment is performed in a later step. Further, by suppressing the thermal decomposition of the resin, it is possible to suppress the decrease in strength of the resin, the drawn resin-impregnated fiber bundle, without passing through the step of removing the resin, it is also possible to use in other applications as it or subjected to a desired processing (such as cutting). Further, by performing the heat treatment below the thermal deterioration temperature of the reinforcing fiber, it is possible to suppress the thermal deterioration of the reinforcing fiber, it is possible to suppress the decrease in strength of the reinforcing fiber.

In the present embodiment, "pulling out the resin-impregnated fiber bundle" means pulling out the resin-impregnated fiber bundle from the tank in a continuous state, and also includes a concept of peeling off the resin-impregnated fiber bundle from the tank. In one embodiment, since the resin-impregnated fiber bundle is drawn in a state in which the resin in the tank is softened by heating, the resin-impregnated fiber bundle can be easily drawn out. When the resin-impregnated fiber bundle is pulled out from the tank, the resin-impregnated fiber bundle may be peeled off using a blade-shaped jig. The resin-impregnated fiber bundle can be easily peeled off by bringing a blade-shaped jig into contact with a portion (resin portion) between the resin-impregnated fiber bundle and the tank surface so as to cut an adhesive portion (resin portion) between the tank and the resin-impregnated fiber bundle.

The method of pulling out the resin-impregnated fiber bundle is not particularly limited, and for example, the resin-impregnated fiber bundle can be pulled out by directly or indirectly connecting the winding end portion of the resin-impregnated fiber bundle to the winding roller and rotating the roller.

The heat treatment can be performed, for example, in a heat treatment chamber. The tank is heated in a heat treatment chamber to soften the matrix resin of the tank. The heat treatment chamber may be a heating furnace, or may be a heating device having a space configured to introduce and/or discharge a heating medium therein.

Figure 12:
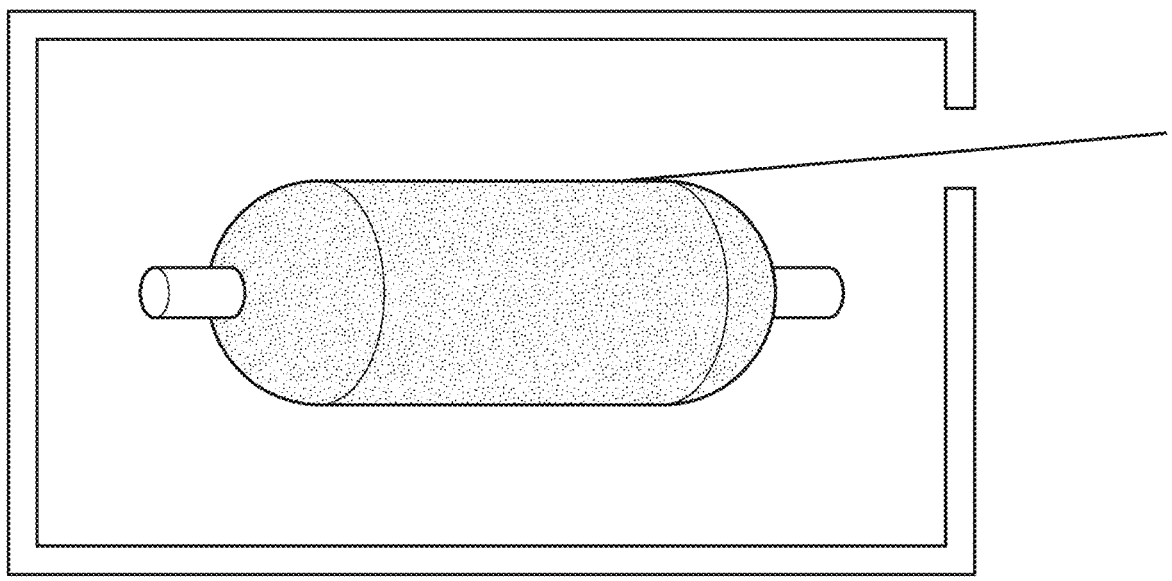
FIG. 12 is a schematic view for explaining a drawing step under heating in the present embodiment.

As a method of pulling out the resin-impregnated fiber bundle while the tank is subjected to the heat treatment, for example, as shown in FIG. 12, a method of disposing the tank in the heat treatment chamber and pulling out a part of the resin-impregnated fiber bundle from the heat treatment chamber while performing the heat treatment is exemplified. For example, the resin-impregnated fiber bundle can be conveyed to the outside from an outlet provided in a part of the heat treatment chamber. The resin-impregnated fiber bundle can be continuously conveyed by, for example, a conveyance roller.

In one embodiment using glass fibers as reinforcing fibers, the temperature of the heat treatment is greater than or equal to the glass transition temperature of the first matrix resin and less than the onset temperature of pyrolysis and less than the thermal degradation temperature of the glass fibers. In an embodiment in which the carbon fiber is used as the reinforcing fiber, the temperature of the heat treatment is equal to or higher than the glass transition temperature of the first matrix resin and is lower than the pyrolysis start temperature, and is lower than the thermal degradation temperature of the carbon fiber.

The onset temperature of pyrolysis of the resin can be measured using a thermogravimetric instrument.

In one embodiment, the pyrolysis initiation temperature is preferably a temperature that exhibits a weight loss of 5% in the weight change chart of thermogravimetric analysis obtained by raising the temperature of the resin at 5° C./min from 30° C. to 550° C. in a nitrogen atmosphere. Preferably, the pyrolysis initiation temperature is a temperature showing a weight loss of 3% in the weight change chart of thermogravimetric analysis obtained by raising the temperature of the resin at 5° C./mini from 30° C. to 550° C. in a nitrogen atmosphere. Preferably, the thermal decomposition initiation temperature is a temperature showing a weight loss of 1% in the weight change chart of thermogravimetric analysis obtained by raising the temperature of the resin at 55° C./mils from 30° C. to 550° C. in a nitrogen atmosphere. In general, the pyrolysis initiation temperature under a nitrogen atmosphere is considered to be the temperature at which the decomposition of the main chain and/or the side chain of the resin begins.

In one embodiment, the pyrolysis initiation temperature is preferably a temperature that exhibits a weight loss of 5% in the weight change chart of thermogravimetric analysis obtained by raising the temperature of the resin at 5° C./min from to 550° C. in an atmospheric atmosphere. Preferably, the thermal decomposition initiation temperature is a temperature showing a weight loss of 3% in the weight change chart of the thermogravimetric analysis obtained by raising the temperature of the resin at 5° C./minute from 30° C. to 550° C. in an atmospheric atmosphere. Preferably, the thermal decomposition initiation temperature is a temperature showing a weight loss of 1% in the weight change chart of the thermogravimetric analysis obtained by raising the temperature of the resin at 5° C./minute from 30° C. to 550° C. in an atmospheric atmosphere. In general, in the heating in the atmosphere, since the oxidative decomposition proceeds by oxygen contained in the atmosphere, if the weight reduction rate is assumed to be the same, the pyrolysis start temperature measured in the atmosphere is lower than the pyrolysis start temperature measured in the nitrogen atmosphere.

In an embodiment in which the glass fiber is used as the reinforcing fiber, a decrease in strength of the glass fiber can be suppressed by heating the tank at a temperature lower than the thermal degradation temperature of the glass fiber. The thermal degradation temperature of the glass fiber may be defined as the minimum temperature at which a decrease in tensile strength occurs by 1% or more when the glass fiber is heat-treated in the atmosphere. The decrease in the strength can be calculated by measuring the tensile strength of the glass fiber used for the resin-impregnated fiber bundle before and after the heat treatment.

In an embodiment in which the carbon fiber is used as the reinforcing fiber, a decrease in the strength of the carbon fiber can be suppressed by heating the tank at a temperature lower than the thermal degradation temperature of the carbon fiber. The thermal degradation temperature of the carbon fiber may be defined as the minimum temperature at which a decrease in tensile strength occurs by 1% or more when the carbon fiber is heat-treated in the atmosphere. The decrease in the strength can be calculated by measuring the tensile strength of the carbon fiber used for the resin-impregnated fiber bundle before and after the heat treatment.

In one embodiment, the temperature of the heat treatment is preferably 100° C. or higher, preferably 120° C. or higher, preferably 140° C. or higher, preferably 160° C. or higher, preferably 180° C. or higher, preferably 200° C. or higher. The temperature of the heat treatment is preferably less than 400° C., preferably 390° C. or less, preferably 380° C. or less, preferably 370° C. or less, preferably 360° C. or less, preferably 350° C. or less, preferably 340° C. or less, preferably 330° C. or less, preferably 320° C. or less, preferably 310° C. or less, preferably 300° C. or less, preferably 290° C. or less, preferably 280° C. or less. When the temperature of the heat treatment is 100° C. or more, the resin in the resin-impregnated fiber bundle can be effectively softened. When the temperature of the heat treatment is less than 400° C., thermal decomposition of the resin in the resin-impregnated fiber bundle can be easily suppressed, and deterioration of reinforcing fibers such as glass fibers and carbon fibers can be easily suppressed. The upper limit value and/or the lower limit value of each of these numerical ranges can be arbitrarily combined to define a preferable range.

Figure 13A:
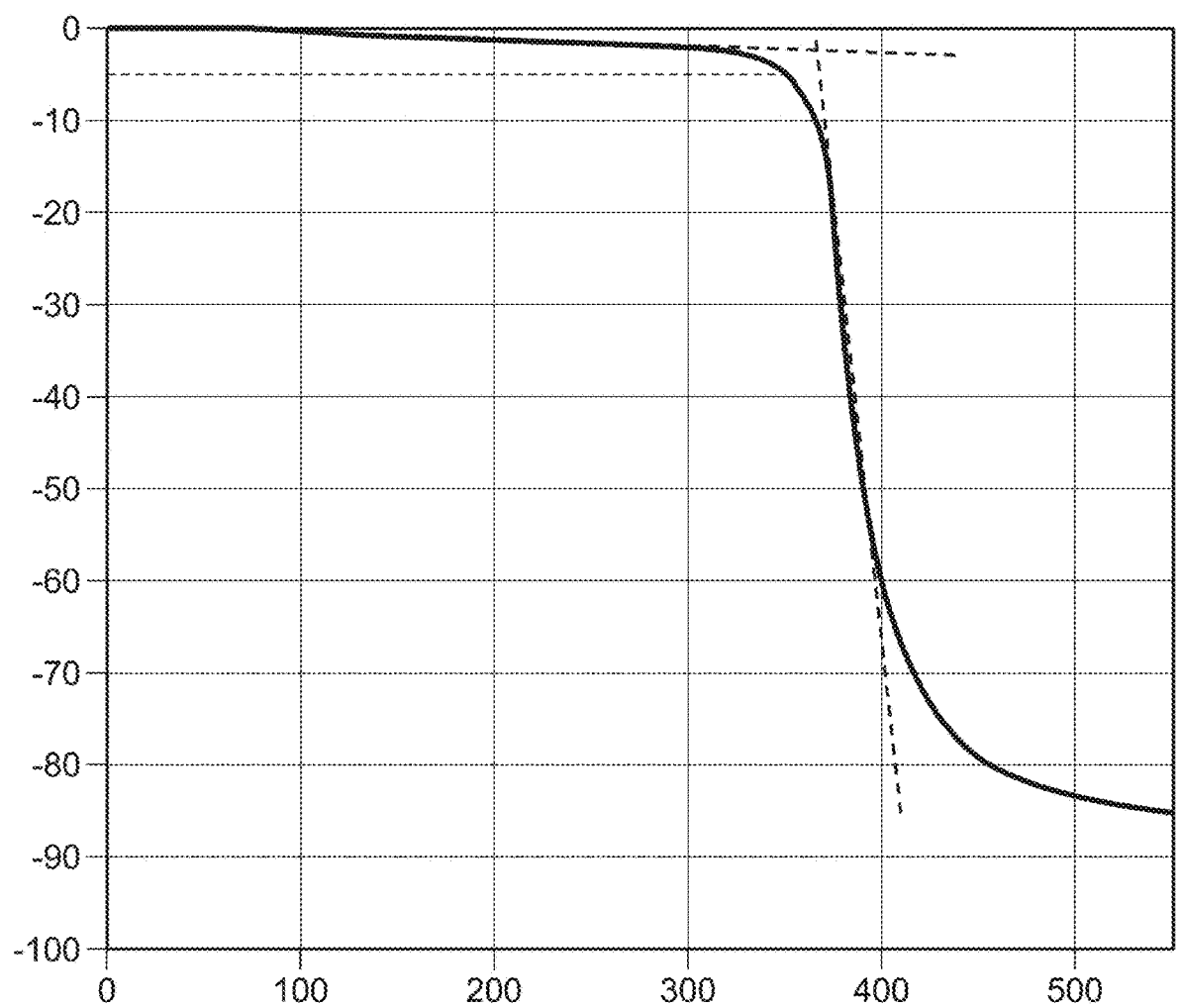
FIG. 13A is a graph showing an example of thermal properties of an epoxy-resin, and is a graph (horizontal axis: temperature, vertical axis: weight reduction rate) showing a gravimetric change chart (TG curve) of thermogravimetric analysis obtained by raising the temperature of the resin in a nitrogen-atmosphere.
Figure 13B:
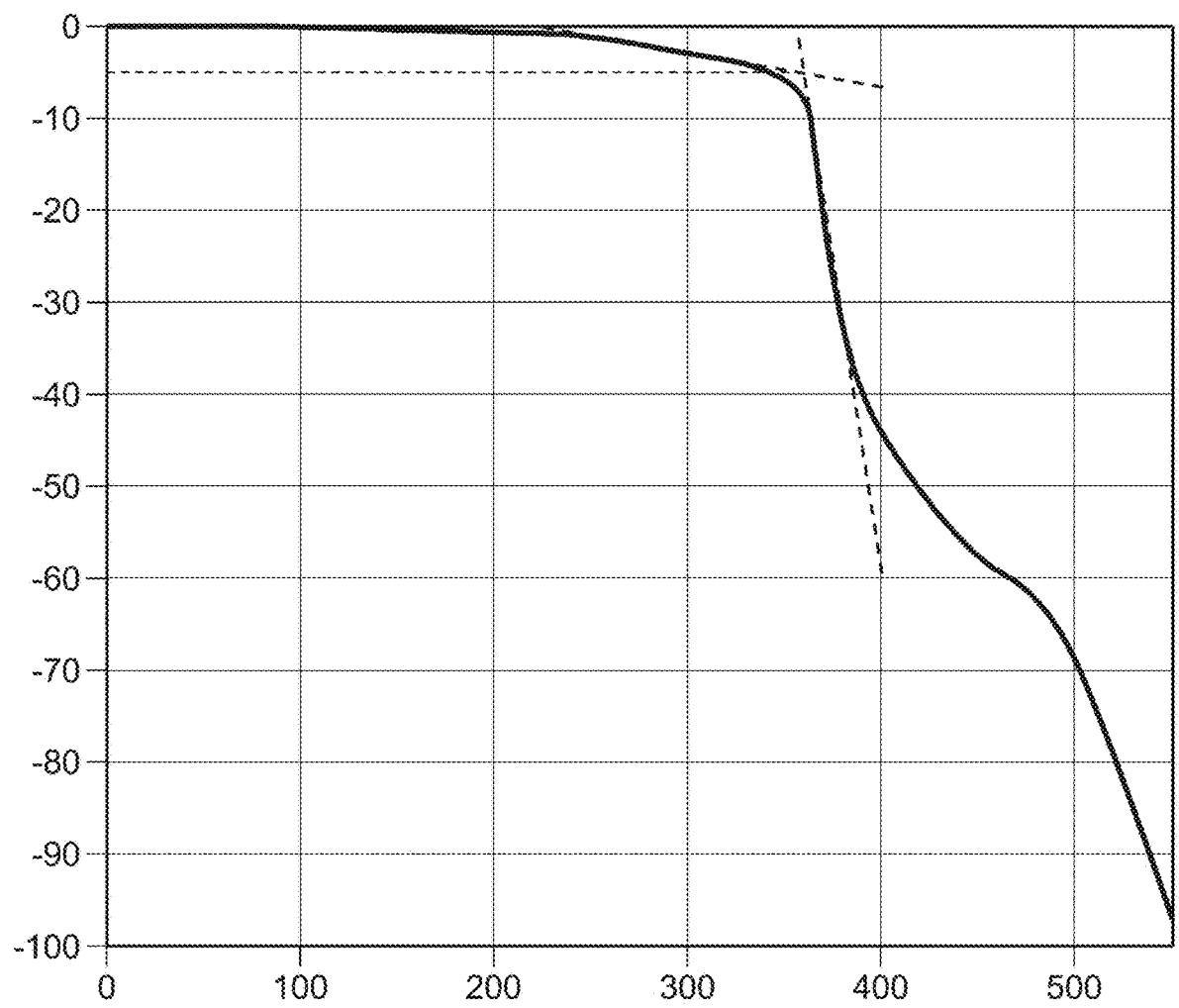
FIG. 13B is a graph showing an example of thermal properties of an epoxy resin, and is a graph (horizontal axis: temperature, vertical axis: weight reduction rate) showing a gravimetric change chart (TG curve) of thermogravimetric analysis obtained by raising the temperature of the resin in an atmosphere.

As an example, the glass transition temperature of the epoxy resin is about 100° C. to 200° C., and the thermal decomposition initiation temperature of the epoxy resin is about 240° C. to 360° C. When the temperature is higher than or equal to the thermal decomposition start temperature, thermal decomposition of the resin occurs excessively, and the strength of the resin is greatly reduced. In addition, excessive deformation and carbonization of the resin occur, and the resin hardly dissolves and removes in the solution. FIG. 13A is a weight change graph of a thermogravimetric analysis of an exemplary epoxy resin obtained by raising the temperature of the resin at 5° C./min from 30° C. to 550° C. in a nitrogen atmosphere. In FIG. 13A, the temperature exhibiting a weight loss of 5% is about 350° C., which temperature can be defined as the pyrolysis onset temperature. Further, FIG. 13B shows a thermogravimetric change chart obtained by heating the resin at 5° C./min from to 550° C. in an air atmosphere for an exemplary epoxy resin. In FIGS. 13A and 13B, inflection points are also shown. In FIG. 13B, the temperature indicating a weight loss of 5% is 340° C., and this temperature can also be defined as the pyrolysis onset temperature. As described above, in the heating in the atmosphere, since the oxidative decomposition proceeds by oxygen contained in the atmosphere, when the weight reduction rate is the same, the pyrolysis start temperature measured in the atmosphere is lower than the pyrolysis start temperature measured in the nitrogen atmosphere. Above the pyrolysis initiation temperature, thermal decomposition of the resin occurs excessively, decomposition of the main chain and/or side chain of the resin occurs excessively, and in some cases carbonization of the resin occurs. When such thermal decomposition occurs, it becomes difficult to dissolve and remove the resin in the dissolving solution. Further, since the strength of the resin decreases, the resin-impregnated fiber bundle itself cannot be reused. On the other hand, in a range of not less than the glass transition temperature and less than the thermal decomposition start temperature defined in one embodiment, the resin can be softened while suppressing the thermal decomposition, and therefore, a high-quality continuous resin-impregnated fiber bundle can be easily obtained by pulling out the resin-impregnated fiber bundle in this state. Thermogravimetric analysis is a method of measuring weight change when the temperature of a substance is changed by a predetermined program. In one embodiment, thermogravimetric analysis can be performed, for example, by placing about a 10 mg of specimen in an aluminum, alumina, or platinum container and measuring the weight change when the temperature is increased at a constant heating rate (5° C./min).

From the viewpoint of more effectively suppressing the thermal decomposition of the resin, the temperature of the heat treatment is preferably a temperature lower than the thermal decomposition start temperature by 1° C. or more, preferably a temperature lower than the thermal decomposition start temperature by 5° C. or more, preferably a temperature lower than the thermal decomposition start temperature by 10° C. or more, preferably a temperature lower than the thermal decomposition start temperature by or more, preferably a temperature lower than the thermal decomposition start temperature by 20° C. or more, preferably a temperature lower than the thermal decomposition start temperature by 25° C. or more, and preferably a temperature lower than the thermal decomposition start temperature by 30° C. or more.

Figure 14:
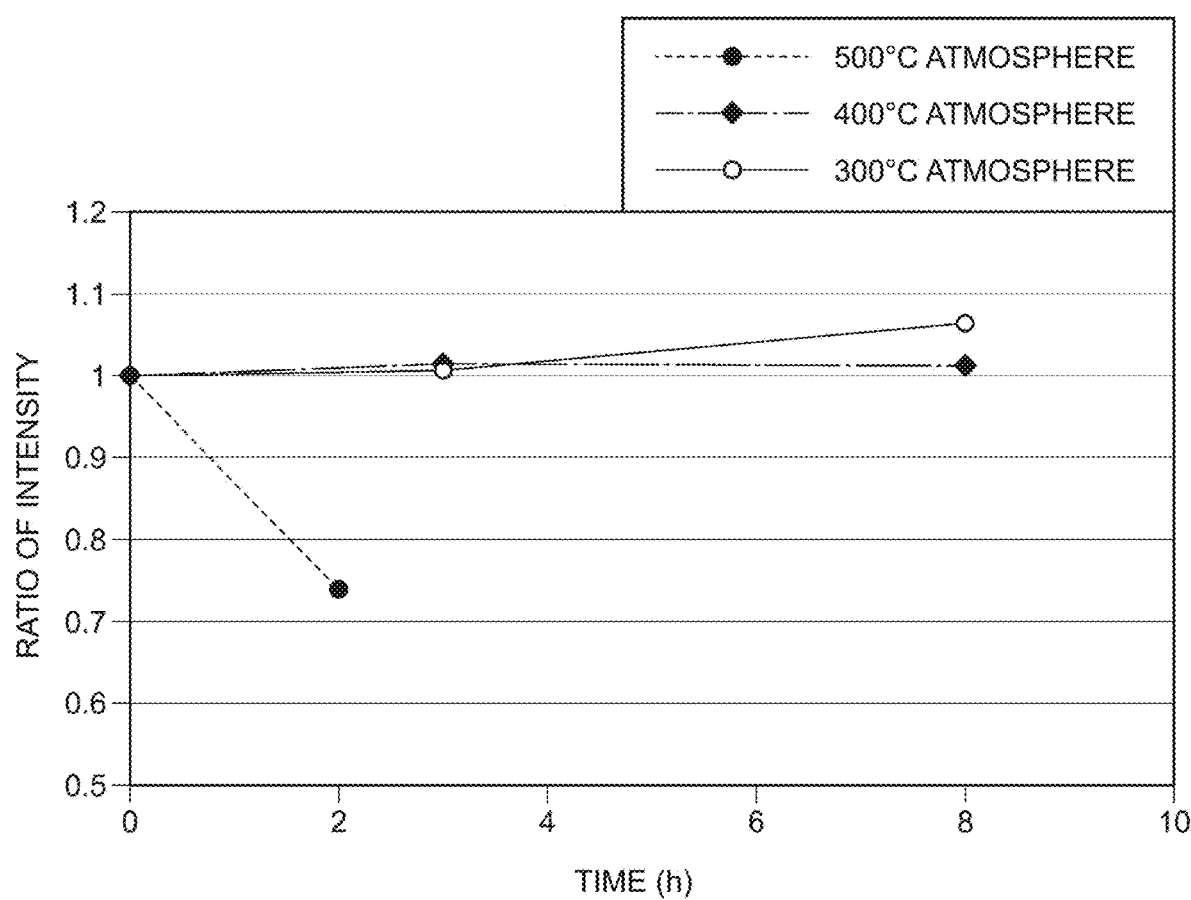
FIG. 14 is a graph showing thermal characteristics of a carbon fiber as an example of a reinforcing fiber, and is a graph showing a predetermined time (horizontal axis) at a predetermined temperature (300° C., 400° C., 500° C.) and a strength ratio (tensile strength after heating/tensile strength before heating) when the carbon fiber is heated in the atmosphere.

FIG. 14 is a graph showing thermal characteristics of a carbon fiber as an example of a reinforcing fiber, and shows a predetermined time (horizontal axis) at a predetermined temperature (300° C., 400° C., 500° C.) and a strength ratio (tensile strength after heating/tensile strength before heating) when the carbon fiber is heated in the atmosphere. As shown in FIG. 14, it can be seen that the strength of the carbon fiber does not decrease even when the carbon fiber is heated at 400° C. On the other hand, it can be seen that when the carbon fiber is heated at 500° C., which is a temperature of a conventional general heat treatment, the strength decreases. This is considered to be due to oxidative degradation of the carbon fiber caused by heat and oxygen. In general, it is believed that the onset temperature of pyrolysis of the resin is often lower than the thermal degradation temperature of the carbon fiber.

Figure 15:
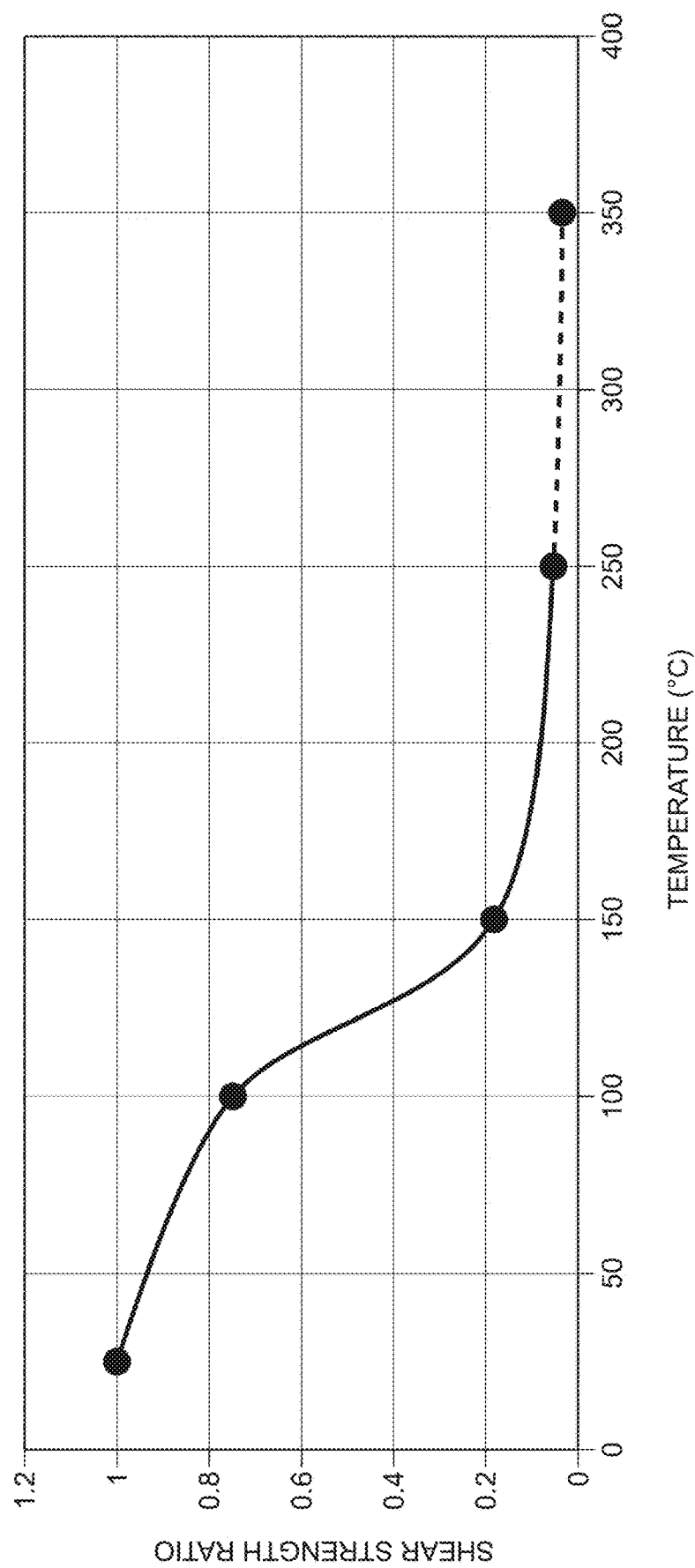
FIG. 15 is a graph showing the tensile shear strength ratio of a resin (epoxy resin) at a predetermined temperature.
Figure 16:
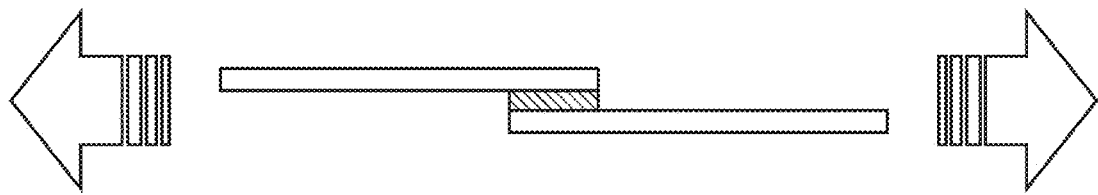
FIG. 16 is a schematic view for explaining a configuration of a test piece used in a tensile shear test for measuring a tensile shear strength ratio shown in FIG. 15.

FIG. 15 is a graph showing a tensile shear strength ratio of a resin (epoxy resin) at a predetermined temperature. Specifically, FIG. 15 shows a tensile shear strength ratio (tensile shear strength at heating/tensile shear strength before heating (strength at 23° C.), vertical axis, • mark) at a predetermined temperature (23° C., 100° C., 150° C., 250° C., horizontal axis). A dotted line from 250° C. to 350° C. represents a virtual curve. Incidentally, the tensile shear strength is the strength when the adhesive joint portion is broken by the shear stress, which is a load for bonding the two plates with resin and shifting the adherends in the opposite direction, as shown in FIG. 16. As shown in FIG. 15, it can be seen that the tensile shear strength decreases as the heating temperature of the resin increases. When the tensile shear strength is reduced, the resin-impregnated fiber bundle can be easily pulled out. For example, when the heating temperature is 150° C., the tensile shear strength ratio is 0.2 or less, the tensile shear strength at the time of heating compared to the tensile shear strength before heating is 20% or less, it can be seen that the resin-impregnated fiber bundle can be drawn with a smaller force. In the present embodiment, the temperature of the heat treatment is preferably a temperature at which the tensile shear strength ratio is 20% or less, preferably a temperature at which the tensile shear strength ratio is 15% or less, preferably a temperature at which the tensile shear strength ratio is 10% or less, and preferably a temperature at which the tensile shear strength ratio is 5% or less.

In the present embodiment, crushing or crushing of the tank is not normally performed. As the tank, only a cylindrical portion of the tank may be used. The metal component or the like in the tank may be removed before the heating step or may be removed after the heating step.

The heating method in one embodiment is not particularly limited. Examples of the heating method include heating in the atmosphere. Heat treatment in the atmosphere can be conveniently performed, and is also advantageous in terms of cost. In particular, even in the presence of oxygen such as air, deterioration of the carbon fiber can be suppressed, which is effective. Further, the heat treatment can be performed using superheated steam. By using the superheated steam, the ratio of the air containing oxygen in the treatment atmosphere can be reduced, and therefore decomposition and damage of the reinforcing fibers can be effectively suppressed. For example, the heat treatment can be performed by introducing atmospheric superheated steam into an atmospheric pressure reaction vessel. Further, the heat treatment is not particularly limited, but may be performed under an inert atmosphere such as nitrogen. The heat treatment may be performed while supplying the heated superheated steam and/or an inert gas (nitrogen or the like) into the heat treatment chamber.

In the recycling method according to the present embodiment, the resin-impregnated fiber bundle drawn out in the drawing step is maintained in a bundle shape by the reinforcing fiber and the matrix resin. In one embodiment, the resin-impregnated fiber bundle can be reused as it is because the decrease in strength of the resin and the reinforcing fiber is suppressed. If necessary, the resin-impregnated fiber bundle obtained may be subjected to a desired processing treatment to be reused. The processing process includes, for example, a process of cutting to a desired size. For example, a sheet-like product can be produced by appropriately mixing and solidifying a cut resin-impregnated fiber bundle with a binder resin or the like.

Removal Process

The recycling method according to the present embodiment may include a step of removing the resin in the resin-impregnated fiber bundle to obtain a reinforcing fiber. The method for removing the resin in the resin-impregnated fiber bundle is not particularly limited, and preferably, dissolution and removal using a dissolving solution is exemplified. According to the dissolution and removal by the dissolution solution, deterioration of reinforcing fibers (for example, glass fibers or carbon fibers) can be suppressed.

Hereinafter, a dissolution and removal step using a dissolution solution as an example of the step of removing the resin will be described.

The dissolving and removing step is a step of dissolving and removing the resin in the drawn resin-impregnated fiber bundle with a dissolving solution.

In one embodiment, the resin in the drawn resin-impregnated fiber bundle is removed by a dissolution removal step. The resin can be dissolved and removed by contacting the resin-impregnated fiber bundle with a dissolving solution. According to the dissolution and removal, it is possible to avoid the stress caused by heat, and it is possible to suppress the deterioration of the reinforcing fibers (for example, glass fibers or carbon fibers). Specifically, removal by the solution causes less deterioration of the reinforcing fibers than removal by thermal decomposition. Further, in one embodiment, since excessive deformation and carbonization of the resin are suppressed in the drawing step under heating, which is the previous step, the resin in the resin-impregnated fiber bundle can be efficiently dissolved.

The resin is dissolved by using a dissolving solution capable of dissolving the resin in the resin-impregnated fiber bundle. The dissolving solution is not particularly limited as long as it can dissolve the resin, and includes, for example, at least one liquid selected from an acidic solution, an organic solvent, hydrogen peroxide solution, and an ionic liquid. These liquids can dissolve the resin or swell the resin, and can efficiently remove the resin. One kind of the dissolving solution may be used alone, or two or more kinds thereof may be used in combination.

Examples of the acidic solution include phosphoric acid and sulfuric acid. Examples of the acidic solution include a solution containing sulfuric acid (for example, a concentration of 90% by mass or more) as described in Japanese Unexamined Patent Application Publication No. 2020-37638 (JP 2020-37638 A), and a solution containing phosphoric acid as described in Japanese Unexamined Patent Application Publication No. 2020-50704 (JP 2020-50704 A). The acidic component may be used singly or in a combination of two or more. For example, the resin can be dissolved and removed by immersing the resin-impregnated fiber bundle in concentrated sulfuric acid. The temperature of the concentrated sulfuric acid may be, for example, 100-300° C. In addition, there is no substantial decrease in strength of the carbon fiber after the resin is removed by the dissolving solution.

Examples of the organic solvents include alipic hydrocarbon solvents, amorphous hydrocarbon solvents, alcohol solvents, ketone solvents, ether solvents, amide solvents, or ester solvents. One kind of the organic solvent may be used alone, or two or more kinds thereof may be used in combination. Examples of the aliphatic hydrocarbon-based solvent include pentane, hexane, heptane, and octane. Examples of the aromatic hydrocarbon-based solvent include benzene, toluene, and xylene. Examples of the organic solvent containing two or more components include petroleum benzene and ligroin. The organic solvent may include a decomposition catalyst. As a decomposition catalyst. Examples thereof include alkali metal compounds as described in Japanese Unexamined. Patent Application Publication No. 2020-45407 (JP 2020-45407 A).

Ionic liquids include, for example, cations including at least one cation selected from imidazolium-based, pyridinium-based, pyrrolidinium-based, quaternary ammonium-based, and quaternary phosphonium-based cations. As the ionic liquid, one kind may be used alone, or two or more kinds may be used in combination.

The dissolution and removal of the resin is performed by bringing the dissolution solution into contact with the resin-impregnated fiber bundle. The method of contacting the solution to the resin-impregnated fiber bundle is not particularly limited, and examples include a dipping method, a die coating method, a bar coating method, a roll coating method, or a gravure coating method. Among these, a dipping method is preferable. Specifically, the dissolution solution can be brought into contact with the reinforcing fibers by conveying the resin-impregnated fiber bundle by a roller so as to be immersed in the dissolution solution disposed in the bath. In one embodiment, the resin-impregnated fiber bundle can be immersed in the dissolution solution while the drawn resin-impregnated fiber bundle is conveyed by a conveyance roller or the like.

The solubility of the resin in the dissolution and removal step can be adjusted by the type of the dissolution solution, the treatment temperature, the treatment time, or the like. The treatment time can be adjusted by, for example, the conveying speed of the resin-impregnated fiber bundle. The processing time is not particularly limited, and can be appropriately set according to the type of the dissolving solution or the resin.

The temperature (liquid temperature) of the dissolution solution can be appropriately set in consideration of the degree of dissolution and removal. The temperature (liquid temperature) of the solution is, for example, 20° C. or higher, 40° C. or higher, 60° C. or higher, 80° C. or higher, and is, for example, 300° C. or lower, 250° C. or lower, 200° C. or lower, 150° C. or lower, and 100° C. or lower.

The dissolution and removal of the resin may be performed by injecting the dissolution solution into the resin-impregnated fiber bundle. That is, the resin in the resin-impregnated fiber bundle can be removed using the injection pressure by applying the injection pressure to the solution and bringing it into contact with the resin-impregnated fiber bundle. The injection device used for injecting the solution is not particularly limited, and for example, a high-pressure cleaning device or the like can be used.

The nozzle pressure at the time of injecting the solution is preferably 1 MPa or higher, preferably 5 MPa or higher, preferably 8 MPa or higher, and preferably 10 MPa or higher. When the pressure is set, the resin can be efficiently removed from the resin-impregnated fiber bundle. Also, the nozzle pressure is preferably less than 30 MPa, preferably less than or equal to 25 MPa, preferably less than or equal to 22 MPa, and preferably less than or equal to 20 MPa. When the pressure is set, it is possible to effectively suppress damage to the reinforcing fibers by the dissolving solution. The distance between the nozzle for injecting the solution and the resin-impregnated fiber bundle to be injected is preferably 10 to 200 cm, and preferably 30 to 100 cm.

Dissolution and removal of the resin may be performed by combining immersion in the solution and injection of the solution.

Sizing Agent Application Step

The recycling method according to the present embodiment may include a step of attaching a sizing agent to a reinforcing fiber (for example, glass fiber or carbon fiber) obtained by removing a resin.

After the removing step, substantially all of the resin is removed, and the bundle of the reinforcing fibers is unbundled to form a single fiber, By applying a sizing agent to the reinforcing fiber, the reinforcing fiber bundle can be easily wound up as a bobbin, and the occurrence of fluffing of the reinforcing fiber and entanglement of the single fiber can be suppressed.

The sizing agent is not particularly limited, for example, epoxy resin, urethane resin, vinyl ester resin, polyamide resin, nylon resin, polyurethane resin (polyethylene or polypropylene), polyester resin, phenol resin, or a mixture thereof. Among these, an epoxy resin, a urethane resin, a vinyl ester resin, or a polyolefin resin is preferable, and an epoxy resin is more preferable. By using an epoxy resin as the sizing agent, the adhesion between the reinforcing fibers and the epoxy resin can be improved. Sizing agent, one may be used alone, it may be used in combination two or more.

The sizing agent is applied to the reinforcing fibers by bringing the sizing agent into contact with the reinforcing fibers. The method of applying the sizing agent is not particularly limited, and examples include a dipping method, a die coating method, a bar coating method, a roll coating method, or a gravure coating method. Among these, a dipping method is preferable. Specifically, the sizing agent can be applied to the reinforcing fibers by conveying the reinforcing fibers with rollers so as to be immersed in the sizing agent disposed in the sizing bath. The sizing agent is preferably dispersed or dissolved in an organic solvent such as water or acetone, and used as a dispersion or solution. From the viewpoint of enhancing the dispersibility of the sizing agent and improving the liquid stability, a surfactant may be added to the dispersion liquid or the solution as appropriate.

Winding Process

The recycling method according to the present embodiment may include a step of winding the reinforcing fiber from which the resin Obtained by the removing step has been removed. It is preferable that the step of winding the reinforcing fiber is performed after the removing step, and when the step of applying the sizing agent is included, the step of applying the sizing agent is performed after the step of applying the sizing agent.

The winding can be performed using, for example, a winding roller. A driving device that provides a driving force for winding the reinforcing fibers is attached to the winding roller. Further, a driving device for rotating the guide roller may be attached to some of the guide rollers. The winding tension, that is, the tension applied to the reinforcing fibers, is preferably smaller. By setting the winding tension in an appropriate range, it is possible to suppress yarn breakage and winding misalignment of the reinforcing fibers, and as a result, it is possible to obtain a longer continuous fiber.

One embodiment includes a step of pulling out a resin-impregnated fiber bundle while performing a heat treatment, a step of removing the resin in the resin-impregnated fiber bundle drawn and conveyed, and a step of winding up the reinforcing fiber conveyed by removing the resin, wherein the reinforcement fiber is wound up downstream while pulling out the resin-impregnated fiber bundle upstream. That is, in one embodiment, the step of winding the reinforcing fibers downstream is performed while the step of drawing the resin-impregnated fiber bundle upstream under heating, and the removal step and optionally the sizing agent application step are performed between the upstream drawing step and the downstream winding step. Further, in one embodiment, the step of winding the reinforcing fibers downstream is performed while the step of drawing the resin-impregnated fiber bundle upstream under heating, and the step of dissolving and removing and optionally applying a sizing agent is performed between the upstream drawing step and the downstream winding step. In such an embodiment, the dissolution removal step can be immediately performed after the drawing step under heating, and the resin can be efficiently removed with the dissolution solution because the resin-impregnated fiber bundle can be brought into contact with the dissolution solution at a high temperature. Specifically, a portion (preferably an end portion) of the resin-impregnated fiber bundle is taken out from the tank, and a portion of the taken-out resin-impregnated fiber bundle is directly or indirectly connected to the winding machine, tension is applied to the resin-impregnated fiber bundle by the winding machine, and the resin-impregnated fiber bundle is pulled out in a continuous fiber state. The resin is removed from the drawn resin-impregnated fiber bundle by the dissolving solution. Then, the reinforcing fiber obtained by removing the resin is wound up by a winding machine.

Partial Removal of the Second Protective Layer In the present embodiment, a step of partially removing the second protective layer, which may be present on the first protective layer made of the resin-impregnated fiber bundle, may be included in order to expose the folded portion of the winding end portion before the folded portion peeling step. That is, the present embodiment may include a step of removing a portion of the second protective layer and exposing a winding end portion of the resin-impregnated fiber bundle before the folded portion peeling step.

FIG. 10 is a schematic view showing a condition in which the second protective layer 30b constituting the front face of the tank 100 shown in FIG. 9 is partially removed and the first protective layer 30a is exposed. Further, the lower view of FIG. 10 is an enlarged schematic view of a portion surrounded by a dotted line in the upper view of FIG. 10, and is a schematic view showing a winding end portion of the exposed resin-impregnated fiber bundle.

A method of removing a part of the second protective layer is not particularly limited, and any method may be used as long as it is possible to remove a part of the second protective layer to expose a winding end portion of the resin-impregnated fiber bundle. Methods for removing a portion of the second protective layer include, for example, laser treatment, dissolution treatment, heat treatment, or a combination thereof.

As described above, a laser treatment can be used as a method of removing a portion of the second protective layer.

Examples of the laser used for the laser treatment include a carbon dioxide laser ($CO_2$ laser), YAG laser, fiber laser, and semiconductor laser. Among these, a carbon dioxide laser is preferably used. The carbon dioxide laser is a kind of gas laser, and is a laser that obtains a continuous wave in an infrared region or a pulse wave with high output power using gaseous carbon dioxide (carbon dioxide gas) as a medium. A laser beam having a wavelength band of 10.6 μm, which is generally used in a carbon dioxide laser, is easily absorbed by a resin, particularly an epoxy resin, and thus it is possible to efficiently remove a part of the second protective layer. On the other hand, although the carbon dioxide laser can efficiently remove the resin, the carbon dioxide laser tends to easily damage reinforcing fibers such as glass fibers or carbon fibers. Therefore, it is preferable that the carbon dioxide laser has a low output. For example, the average output of the carbon dioxide laser continuous wave, it is preferred that 100 W or less, it is favorable that 50 W or less, it is favorable that 40 W or less, it is 30 W or less.

Figure 17:
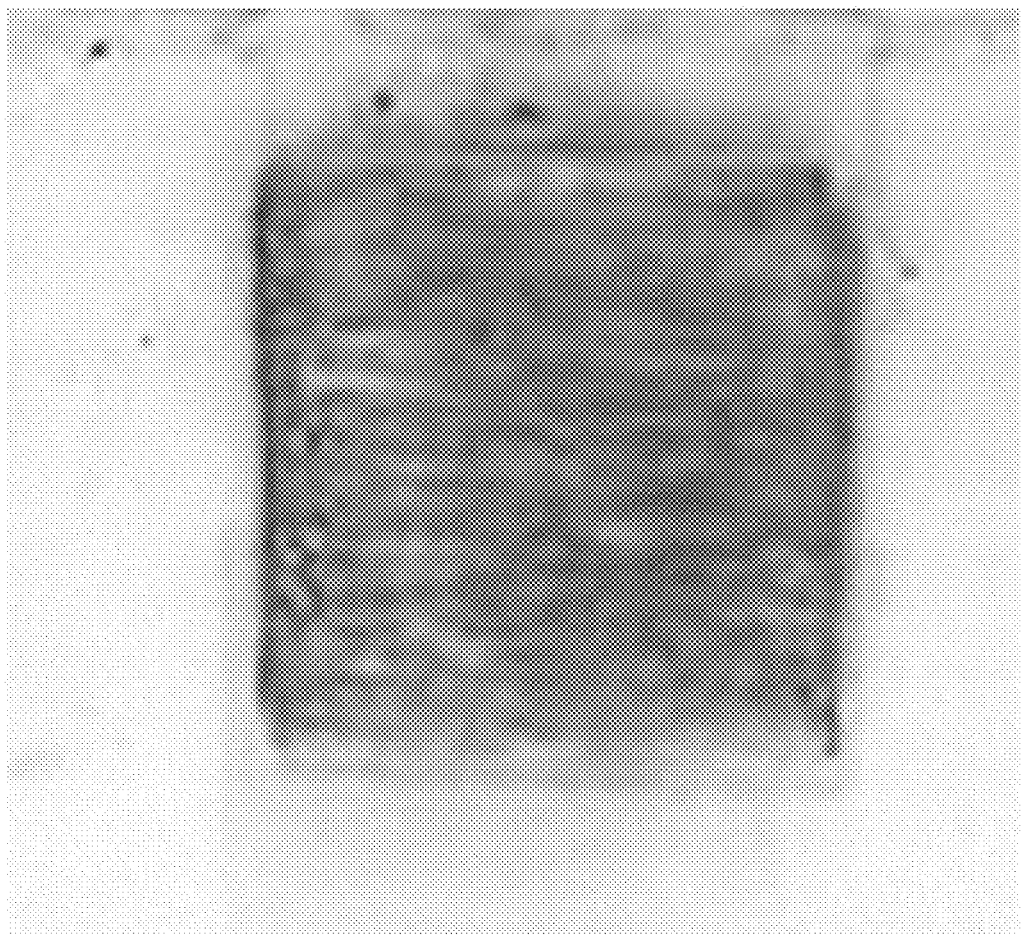
FIG. 17 is an image of low power (mean power: 30 W) carbon dioxide lasers (10.6 μm, continuous-wave) after removing the epoxy-resin as the second protective layer.

FIG. 17 is an image showing a state after removing the epoxy-resin as the second protective layer with a low-power (mean power: 30 W) carbon dioxide laser (10.6 μm, continuous-wave). It is confirmed that by using a low-power carbon dioxide laser, the resin layer can be efficiently removed without damaging the glass fibers in the first protective layer. When the second protective layer is removed by a laser, the first matrix resin in the first protective layer may also be partially removed.

Figure 18:
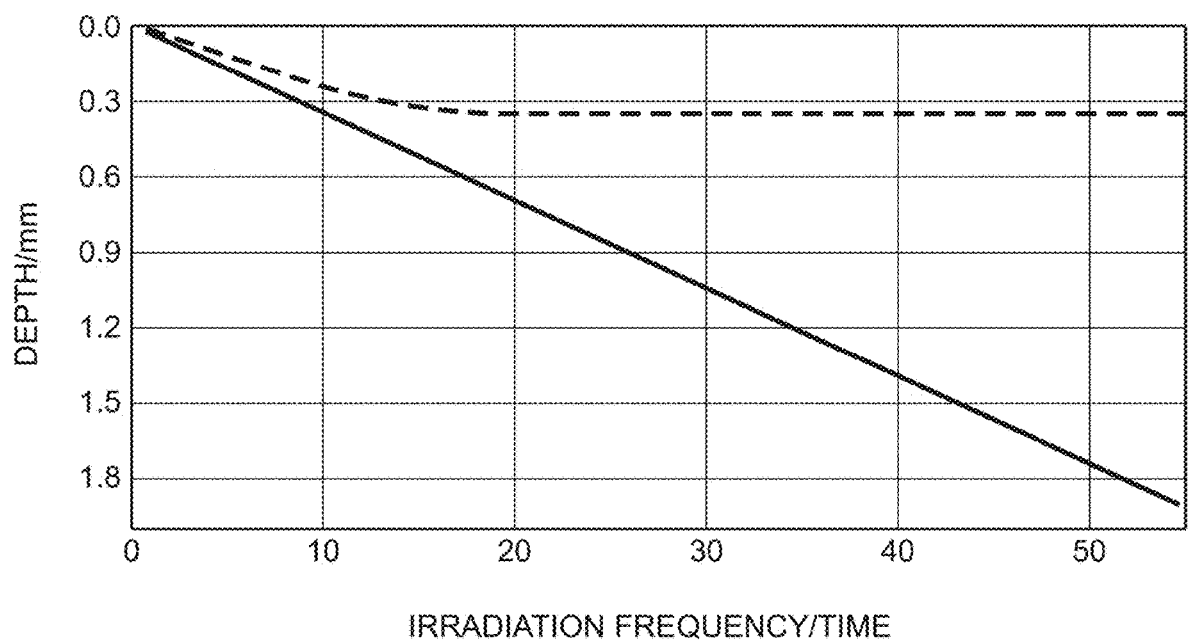
FIG. 18 is a graph showing the relation between the number of times of laser irradiation and the etch depth (mm) when the epoxy-resin as the second protective layer is removed by a carbon dioxide laser (10.6 μm, continuous-wave) with low power (mean power: 30 W)

FIG. 18 is a graph showing a relation between the number of times of laser irradiation and the etch depth (mm) when the epoxy-resin as the second protective layer is removed by a carbon dioxide laser (10.6 μm, continuous-wave) with low power (mean power: 30 W). One laser irradiation is performed by scanning a continuous wave carbon dioxide laser having a predetermined beam cross-sectional area so as to irradiate the entire target region at a constant speed. In one laser irradiation, the laser is scanned so as not to irradiate the same position as much as possible. With respect to the etching depth, a depth indicated by a dotted line represents a distance from the surface of the second protective layer to the surface of the glass fiber bundle of the first protective layer, and a depth indicated by a solid line represents a distance from the surface of the second protective layer to the surface of the resin in the first protective layer. As shown in FIG. 18, the etching depth to the resin surface in the first protective layer becomes deeper as the number of times of irradiation increases, while the etching depth to the glass fiber bundle surface becomes constant from the point where the number of times of irradiation is about 15. This indicates that the resin layer can be efficiently removed by using a low-power carbon dioxide laser without damaging the glass fibers in the first protective layer.

Figure 19A:
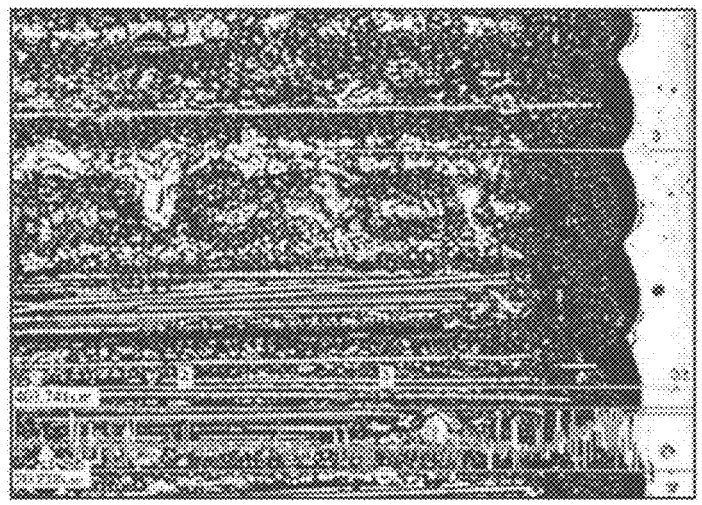
FIG. 19A is an image showing the tank surface at the 10th irradiation frequency in the experiment shown in FIG. 18.
Figure 19B:
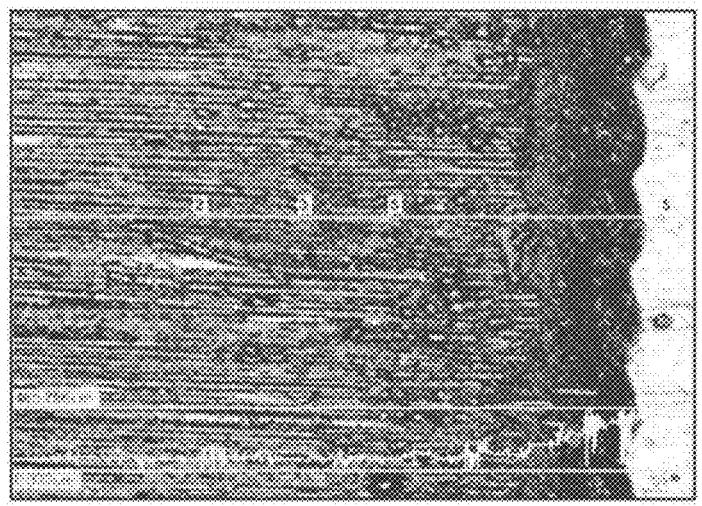
FIG. 19B is an image showing the surface of the tank at the 20th irradiation frequency in the experiment shown in FIG. 18.
Figure 19C:
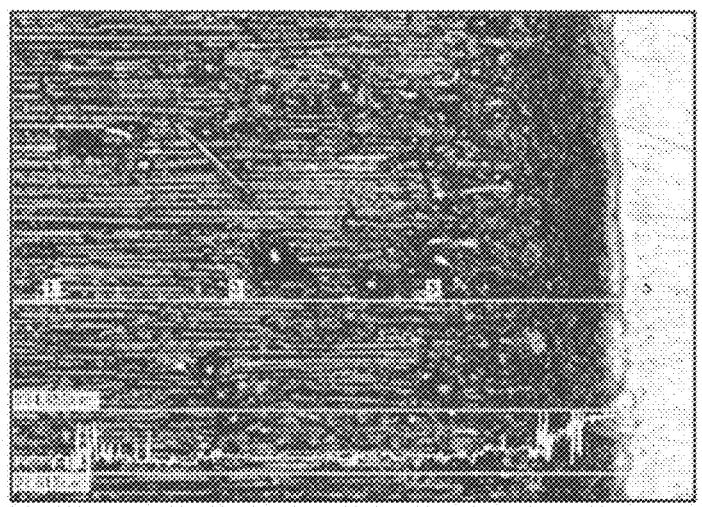
FIG. 19C is an image showing the tank surface at the 50th irradiation frequency in the experiment shown in FIG. 18.

FIGS. 19A, 19B, and 19C are images of the tank surface at the tenth, twentieth, and fiftieth times of irradiation in the experiment shown in FIG. 18. It is also confirmed from the image that the resin is etched as the number of times of irradiation increases, and that the glass fiber is not damaged even in the 20th and 50th times of irradiation.

As described above, as a method of removing a part of the second protective layer, a dissolution treatment can be used. Specifically, a portion of the second protective layer may be removed by contacting the solution with a portion of the second protective layer.

The first matrix resin constituting the second protective layer is dissolved by using a dissolving solution capable of dissolving the resin. The dissolving solution is not particularly limited as long as it is capable of dissolving the first matrix resin, but includes, for example, at least one liquid selected from the above-mentioned acidic solution, organic solvent, hydrogen peroxide solution, and ionic liquid. These liquids can dissolve the resin or swell the resin, and can efficiently remove the resin. One kind of the dissolving solution may be used alone, or two or more kinds thereof may be used in combination.

A method of bringing the solution into contact with a part of the second protective layer is not particularly limited, but for example, a method of arranging a sponge member or the like in which the solution is immersed so as to be in contact with a target region of the second protective layer is exemplified.

In the present embodiment, a combination of a laser treatment and a dissolution treatment may be used as a method of removing a part of the second protective layer. For example, first, the resin can be removed roughly by laser treatment, and then the remaining resin can be removed by a dissolving solution.

As described above, a heat treatment can be used as a method of removing a part of the second protective layer. Specifically, a portion of the second protective layer can be removed by selectively heating. The temperature of the heat treatment may be, for example, 550° C. or more and 700° C. or less from the viewpoint of thermally decomposing the resin.

The means for partially heating the second protective layer is not particularly limited, but for example, a heater may be used.

In the method for recycling reinforcing fibers according to the present embodiment having the above-described steps, it is possible to efficiently obtain reinforcing fibers suitable for reuse.

According to the above-described method for recycling reinforcing fibers of the present embodiment, it is possible to efficiently obtain high-quality reinforcing fibers suitable for reuse. The resulting reinforcing fibers are applicable to a wide range of applications.

The upper limit value and/or the lower limit value of the numerical range described in the present specification can be combined with each other as desired to define a preferable range. For example, the upper limit value and the lower limit value of the numerical range can be combined as desired to define a preferable range, the upper limit values of the numerical range can be combined as desired to define a preferable range, and the lower limit values of the numerical range can be combined as desired to define a preferable range.

Throughout this specification, any reference to "one embodiment," "an embodiment," or "an embodiment" means that a particular feature, structure, or characteristic described in connection with the embodiment is included in at least one embodiment. Accordingly, the recited phrases or variations thereof described throughout this specification are not necessarily all referring to the same embodiment.

Although the present embodiment has been described in detail above, the specific configuration is not limited to this embodiment, and even if there are design changes within a range not departing from the gist of the present disclosure, they are included in the present disclosure.

What is claimed is:

1. A tank comprising a liner and a first protective layer, the first protective layer being disposed on an outer peripheral surface of the liner and configured such that a resin-impregnated fiber bundle containing a reinforcing fiber bundle and a first matrix resin is wound around the liner, wherein a folded portion that is fixed in a state where the resin-impregnated fiber bundle is folded is provided at a winding end of the resin-impregnated fiber bundle.

2. The tank according to claim 1, wherein the folded portion spans both longitudinal sides of the resin-impregnated fiber bundle.

3. The tank according to claim 1, wherein the resin-impregnated fiber bundle is folded such that a folding direction differs from a winding direction.

4. The tank according to claim 3, wherein when the folded portion is viewed in a radial direction from an outside of the tank, a folding angle between a longitudinal direction of a portion of the resin-impregnated fiber bundle forward of the folded portion and a longitudinal direction of a portion of the resin-impregnated fiber bundle rearward of the folded portion is more than 1 degree and less than 180 degrees.

5. The tank according to claim 4, wherein the folding angle is 1 degree or more and 150 degrees or less.

6. The tank according to claim 1, wherein the resin-impregnated fiber bundle is folded such that a folding direction is consistent with a winding direction.

7. The tank according to claim 6, wherein when the folded portion is viewed in a radial direction from an outside of the tank, a folding angle between a longitudinal direction of a portion of the resin-impregnated fiber bundle forward of the folded portion and a longitudinal direction of a portion of the resin-impregnated fiber bundle rearward of the folded portion is less than 1 degree.

8. The tank according to claim 1, wherein a different material from the resin-impregnated fiber bundle is disposed and interposed between a portion of the resin-impregnated fiber bundle forward of the folded portion and a portion of the resin-impregnated fiber bundle rearward of the folded portion.

9. The tank according to claim 8, wherein the different material is ring-shaped or plate-shaped.

10. The tank according to claim 1, wherein the reinforcing fiber bundle is a glass fiber bundle or a carbon fiber bundle.

11. The tank according to claim 10, wherein the reinforcing fiber bundle is the glass fiber bundle.

12. The tank according to claim 11, further comprising a reinforcing layer, wherein:
the first protective layer is configured such that a resin-impregnated glass fiber bundle containing the glass fiber bundle and the first matrix resin is wound around the liner;
the reinforcing layer is disposed between the first protective layer and the liner; and
the reinforcing layer is configured such that a resin-impregnated carbon fiber bundle containing the carbon fiber bundle and a second matrix resin is wound around the liner.

13. The tank according to claim 12, wherein a folded portion that is fixed in a state where the resin-impregnated carbon fiber bundle is folded is provided at a winding end of the resin-impregnated carbon fiber bundle.

14. The tank according to claim 1, further comprising a second protective layer that is provided on the first protective layer and composed of the first matrix resin.

15. A method being a method of recycling a reinforcing fiber, the method comprising:
preparing the tank according to claim 1;
peeling off the folded portion at the winding end from a surface of the tank; and
pulling the winding end that is peeled and drawing the resin-impregnated fiber bundle.

* * * * *